(12) United States Patent
Nagata et al.

(10) Patent No.: US 6,937,209 B1
(45) Date of Patent: Aug. 30, 2005

(54) IMAGE DISPLAY SYSTEM

(75) Inventors: Hideki Nagata, Kobe (JP); Takeshi Endo, Osaka (JP); Ichiro Kasai, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 31 days.

(21) Appl. No.: 09/657,430

(22) Filed: Sep. 7, 2000

(30) Foreign Application Priority Data

Sep. 7, 1999 (JP) ................................. 11-252647

(51) Int. Cl.[7] .............................................. G09G 5/00
(52) U.S. Cl. ......................... 345/1.1; 345/1.3; 353/94
(58) Field of Search ................... 345/1.1, 4–7, 1.3; 353/82, 94, 34, 48, 88–89

(56) References Cited

U.S. PATENT DOCUMENTS

| | | | | |
|---|---|---|---|---|
| 4,991,955 A | * | 2/1991 | Vetter ............................ | 352/69 |
| 5,264,881 A | * | 11/1993 | Brooke ......................... | 353/94 |
| 5,537,127 A | * | 7/1996 | Jingu ............................ | 345/1 |
| 5,579,026 A | * | 11/1996 | Tabata .......................... | 345/8 |
| 5,582,518 A | * | 12/1996 | Henique et al. .............. | 434/44 |
| 5,926,153 A | | 7/1999 | Ohishi et al. ................. | 345/1 |
| 6,170,953 B1 | * | 1/2001 | Lee et al. ..................... | 353/82 |
| 6,190,172 B1 | * | 2/2001 | Lechner ....................... | 434/44 |
| 6,195,068 B1 | * | 2/2001 | Suzuki et al. ............... | 345/1.1 |
| 6,232,933 B1 | * | 5/2001 | Nishida ........................ | 345/1 |
| 6,377,230 B1 | * | 4/2002 | Yamazaki et al. ............ | 345/7 |

FOREIGN PATENT DOCUMENTS

| | | |
|---|---|---|
| JP | 08-227105 A | 9/1996 |
| JP | 09-237353 A | 9/1997 |
| JP | 10-078623 A | 3/1998 |

* cited by examiner

*Primary Examiner*—Alexander Eisen
*Assistant Examiner*—Kimnhung Nguyen
(74) *Attorney, Agent, or Firm*—Sidley Austin Brown & Wood LLP

(57) ABSTRACT

An image display apparatus has an observation room for housing an observer, and the side faces, floor face, and ceiling face of the observation room are used as screens, onto which images displayed on a smaller number of image display devices than the number of screens are projected. At least one image display device displays, on a time-division or screen-division basis, images to be projected onto two or more screens so that images are projected onto all of the screens.

8 Claims, 21 Drawing Sheets

IMAGE DISPLAY SYSTEM

This application is based on application No. H11-252647 filed in Japan on Sep. 7, 1999, the entire contents of which are hereby incorporated by reference.

BACKGROUND OF THE INVENTION

1. Field of the Invention

The present invention relates to an image display system, and particularly to an image display system that displays an image in such a way as to surround an observer and thereby offers a high degree of realism.

2. Description of the Prior Art

In the field of virtual reality that is aiming at presenting an image of an actually nonexistent space with a high degree of realism, it is essential to display an image representing as wide a space as possible. To achieve this, it has been becoming increasingly common to display an image not only in front of an observer but also around the observer so that the image surrounds the observer. For example, according to one conventional proposal, a box-like observation room so large as to house an observer is constructed, and an image is displayed on the side faces, on the floor face, and even on the ceiling face thereof so that the observer is surrounded by the four-, five-, or six-faced image.

In such an image display apparatus, the wall faces of the observation room are used as screens onto which enlarged images of images formed on image display devices are projected. Here, as many image display devices as the number of screens are provided, and, to permit the images formed on the image display devices to be projected onto the screens, as many projection optical systems as the number of screens are provided. To prevent the light projected from the projection optical systems from being intercepted by the body of the observer, it is customary to use transmissive screens onto which an image is projected from outside the observation room. Moreover, to minimize the size of the entire apparatus, mirrors for turning the optical path of the projected light are arranged between the projection optical systems and the screens.

Furthermore, to give perspective to the displayed image (i.e. to make the displayed image three-dimensional), a conventional method is used in combination whereby two images that differ in their view points so much as to correspond to the parallax between the right and left eyes are displayed alternately, with one image directed to the right eye and the other directed to the left eye. In this case, the observer observes the image while wearing goggles provided with shutters that are switched between a light transmitting state and a light intercepting state in synchronism with the alternation of the two images. Moreover, it is also common to accompany the displayed image with matching sound to offer a higher degree of realism to the observer.

In this way, there have already been realized image display apparatuses that offer a very high degree of realism by surrounding an observer with an image so that as wide a space as possible is represented by the image, and by using sound as well.

However, such conventional image display apparatuses still leave room for improvement both in their construction and in the kinds of realism they can offer. For example, as to the construction, such image display apparatuses require so many image display devices and projection optical systems as the number of screens and thus require a complex construction that makes their miniaturization difficult. Moreover, the observation room is installed on a non-mobile basis, which greatly limits the location where the projected image can be observed. As to the kinds of realism, such image display apparatuses offer solely sensation as is experienced on the earth and do not exploit senses other than sight and hearing. For example, no image display apparatus has ever been proposed that offers sensation as is experienced underwater or under low gravity.

Furthermore, conventional image display apparatuses have also the disadvantage of not permitting the image displayed with a high degree of realism to be shared by two or more observers. It is possible to house two or more observers in one observation room, but the two observers cannot be in exactly identical positions at a time, and therefore, even if the displayed image is optimized for one observer, it is not so for the other, who is thus obliged to observe the image with a lower degree of realism.

It is possible to construct a plurality of observation rooms to permit the observer in every observation room to observe an optimized image. This construction, however, is equivalent to constructing a plurality of image display apparatuses independently, and thus cannot provide each observer with the sensation that the other observers are around.

SUMMARY OF THE INVENTION

An object of the present invention is to provide an image display system that offers a high degree of realism, and more particularly to simplify the construction of such an image display system.

To achieve the above object, according to one aspect of the present invention, an image display system is provided with: at least two screens onto which images are projected; at least one display device for displaying the images that are to be projected onto the screens, the total number of display devices being smaller than the total number of screens; and at least one projection optical system for projecting the images displayed on the display device onto the screens.

In this image display system, the total number of display devices is smaller than the total number of screens, so that a single display device displays two or more images to be projected onto two or more screens. The total number of display devices may be one. It is possible to make a single display device display two or more images, for example, by making it display different images in different periods, or by making it display different images in different parts of the display surface thereof.

To permit the images displayed on the display devices to be projected onto the screens, it is necessary to provide at least as many projection optical systems as the number of display devices. Thus, the number of projection optical systems can also be made smaller than the number of screens. By reducing the number of display devices in this way and reducing the number of projection optical systems accordingly, it is possible to simplify both directly and indirectly the construction of the image display apparatus, and thereby make the image display apparatus compact.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
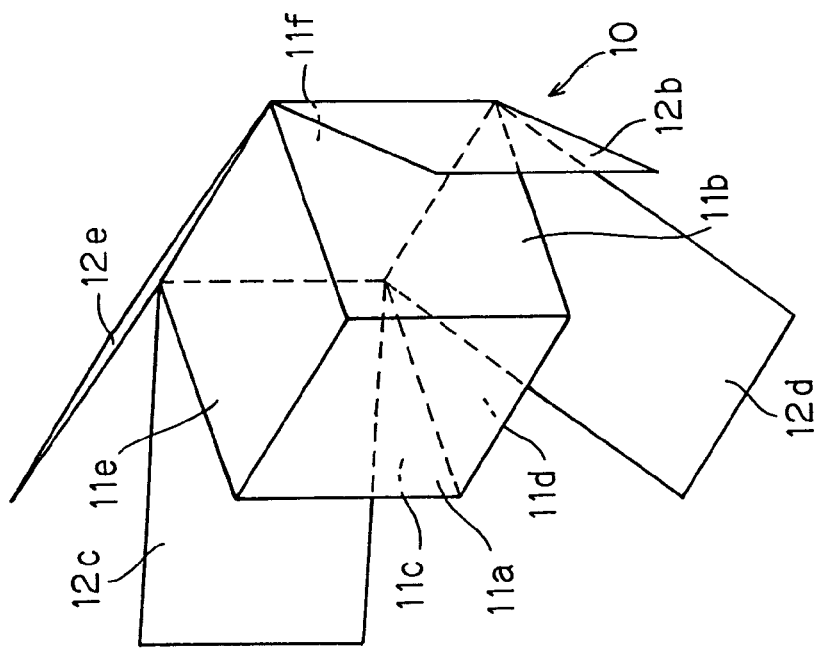
FIG. 1 is a diagram showing the outline of the overall construction of the image display apparatus of a first embodiment of the invention.
Figure 1:
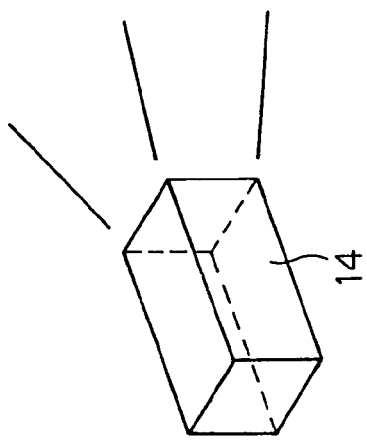

Hereinafter, image display apparatuses embodying the present invention will be described with reference to the drawings. FIG. 1 shows the outline of the overall construction of an image display apparatus 1 of a first embodiment of the invention. The image display apparatus 1 is provided with an observation room 10 and a projector unit 14, and is of a projection type in which an image displayed in the projector unit 14 is projected onto the observation room 10. An observer observes the projected image from within the observation room 10.

The observation room 10 has the shape of a hollow rectangular parallelepiped, and has a front face 11a, a left side face 11b, a right side face 11c, a floor face 11d, a ceiling face 11e, and a rear face 11f. The observation room 10 is so large as to house the observer in an standing position. The rear face 11f of the observation room 10 is openable so as to serve as a door that permits the observer in and out.

The other five faces 11a to 11e than the rear face 11f of the observation room 10 are made of a material that transmits visible light, and have fine irregularities formed over the entire surfaces thereof to disperse the light that passes therethrough. These faces serve as screens onto which the image from the projector unit 14 is projected. Hereafter, the faces 11a to 11e will be referred to also as screens. The observer inside the observation room 10 is surrounded by five screens located above, below, on the left of, on the right of, and in front of the observer, and thus the image presented to the observer covers a very wide space.

At the outward-facing (back) sides of the four screens 11b, 11c, 11d, and 11e of the observation room 10, total-reflection mirrors 12b, 12c, 12d, and 12e are disposed that individually direct the light from the projector unit 14 to those screens. The total-reflection mirrors 12b to 12e are arranged at angles to the screens 11b to 11e, with their rear face 11f side ends located close to the screens 11b to 11e.

Figure 2:
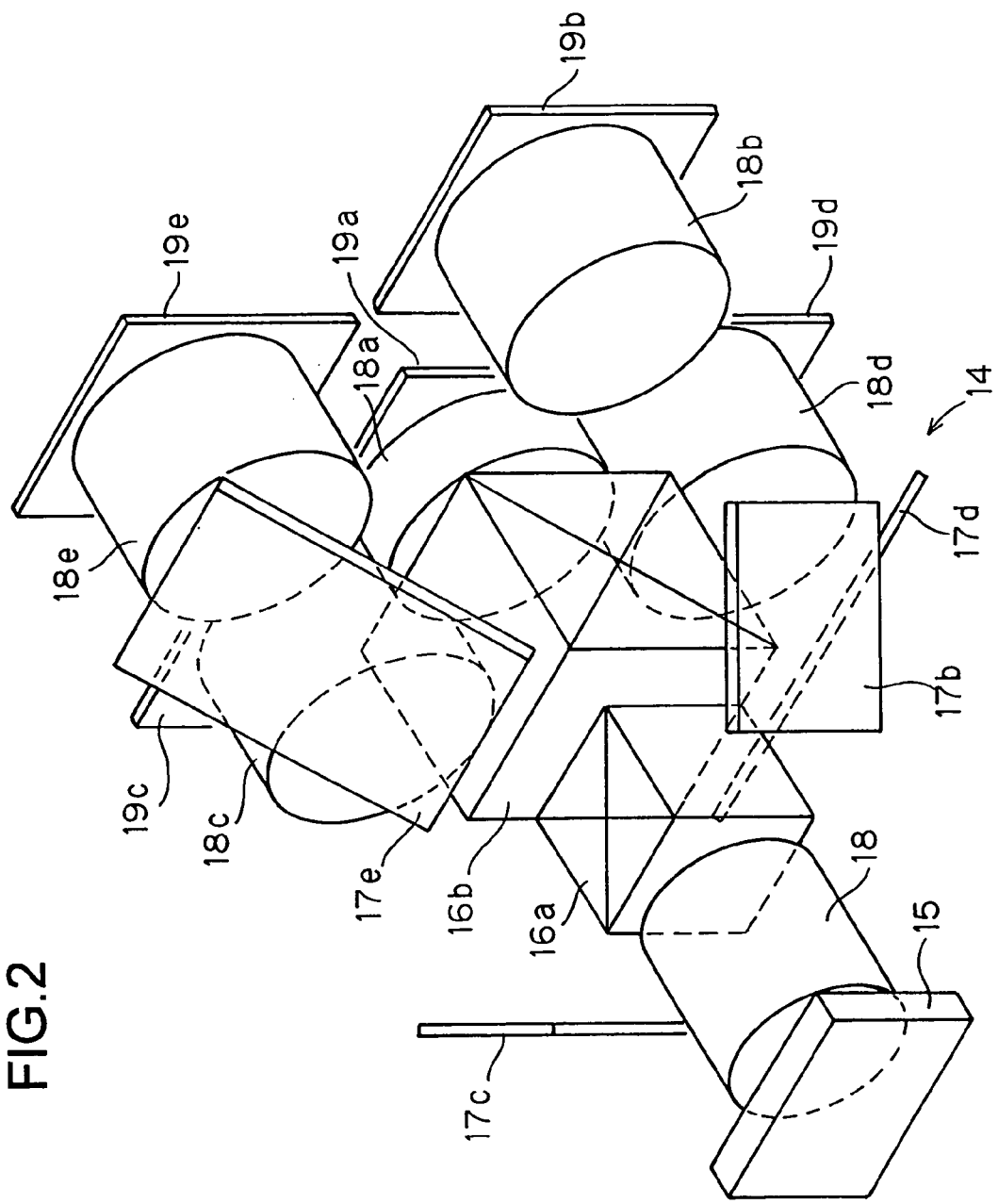
FIG. 2 is a perspective view of the projector unit of the image display apparatus of the first embodiment.

The projector unit 14 is arranged just opposite the front face 11a of the observation room 10. FIG. 2 shows the construction of the projector unit 14. The projector unit 14 is composed of an image display device 15, two cross prisms 16a and 16b, four total-reflection mirrors 17b, 17c, 17d, and 17e, six lens units 18, 18a, 18b, 18c, 18d, and 18e, and five shutters 19a, 19b, 19c, 19d, and 19e.

The image display device 15 displays an image to be projected onto the screens 11a to 11e. In this embodiment, as the image display device 15 is used a transmissive liquid crystal display device. The image display device 15 does not simultaneously display the entire image covering a wide space that is to be presented to the observer, but displays it on a time-division basis. That is, the total area covered by the image to be presented to the observer is divided into five parts that correspond to the five screens, and the images of those five parts are displayed sequentially at predetermined time intervals.

The five lens units 18a to 18e each constitute a projection optical system together with the lens unit 18. That is, the image display apparatus 1 is provided with five projection optical systems that share the lens unit 18 as their front unit and that use the lens units 18a to 18e respectively as their rear unit. The projection optical system constituted by the front unit 18 and the rear unit 18a projects the light from the image display device 15 toward the screen 11a so as to focus it on the screen 11a. The four projection optical systems constituted by the front unit 18 and the rear units 18b to 18e respectively project the light from the image display device 15 toward the total-reflection mirrors 12b to 12e so as to focus it on the screens 11b to 11e.

The cross prisms 16a and 16b are each composed of four rectangular prisms cemented together. On the cementing surfaces of the cross prisms 16a and 16b, semi-transmissive films are provided that partially transmit and partially reflect light and that thus act as half mirrors. The cross prism 16a is arranged in such a way that the line at which its four rectangular prisms intersect extend perpendicularly (vertically), and the cross prism 16b is arranged in such a way that the line at which its four rectangular prisms intersect extend levelly (horizontally). The light from the image display device 15 first passes through the front unit 18 of the projection optical systems, and is then split by the cross prism 16a into one light beam transmitted therethrough and two light beams reflected therefrom. The light beam transmitted here is then further split by the cross prism 16b into one light beam transmitted therethrough and two light beams reflected therefrom.

The total-reflection mirrors 17b and 17c respectively direct the light beams reflected from the cross prism 16a to the rear units 18b and 18c, and the total-reflection mirrors 17d and 17e respectively direct the light beams reflected from the cross prism 16b to the rear units 18d and 18e. Thus, the light from the image display device 15 is eventually formed into five light beams, with the light beam transmitted through both of the cross prisms 16a and 16b traveling at the center, and are then projected onto the five screens 11a to 11e of the observation room 10.

The shutters 19a to 19e shut off the light beams projected from the five projection optical systems in synchronism with the time-division display of the image display device 15. Specifically, the shutters 19a to 19e are each opened only while the image display device 15 is displaying the image to be projected onto corresponding one of the screens 11a to 11e. This prevents an image to be projected onto one screen from being projected on another screen. In this embodiment, the shutters 19a to 19e are arranged in the optical paths of the light beams after passing through the rear units 18a to 18e of the projection optical systems; however, they may be arranged elsewhere as long as they are placed in the optical paths of the light beams after being split by the cross prisms 16a and 16b.

As described above, the image display device 15 displays images on a time-division basis. Meanwhile, not only are the displayed images switched so as to correspond to the screens 11a to 11e, but the displayed images are also inverted upside down and reversed the right side left in appropriate manners so that the images projected onto the screens 11b to 11e by way of the total-reflection mirrors 12b to 12e are continuous to the image projected directly onto the screen 11a. Specifically, the images to be projected onto the screens 11b and 11c are displayed in a state reversed the right side left, and the images to be projected onto the screens 11d and 11e are displayed in a state inverted upside down.

Figure 3:
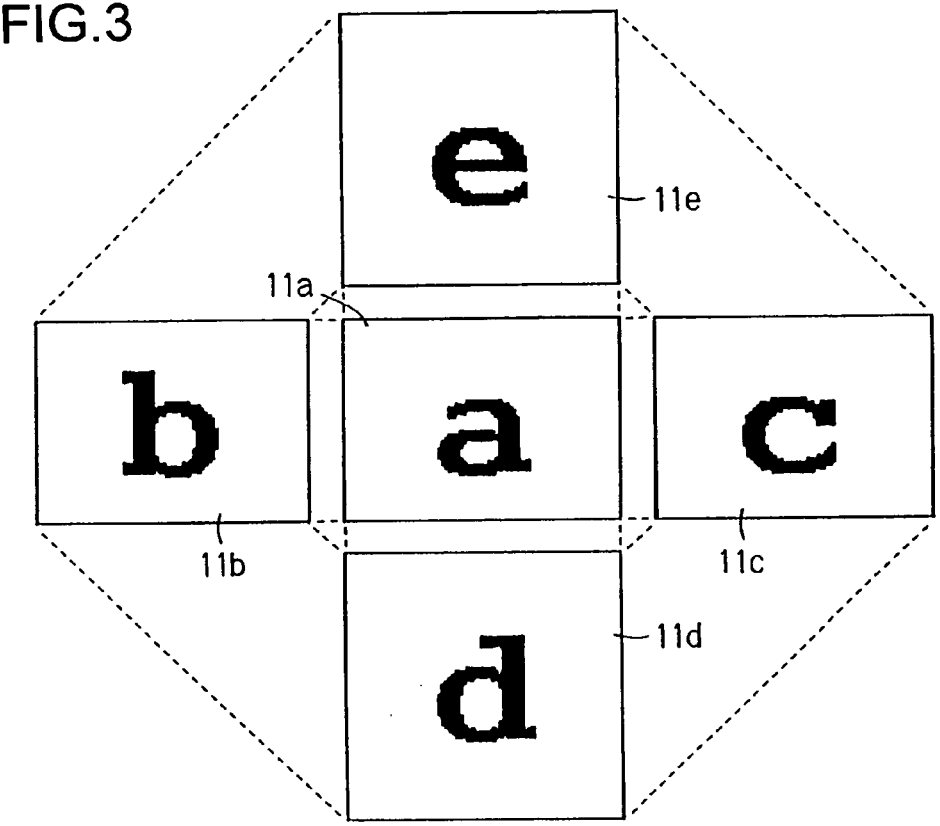
FIG. 3 is a diagram schematically showing an example of images projected onto the observation room of the image display apparatus of the first and a second embodiment of the invention.
Figure 4:
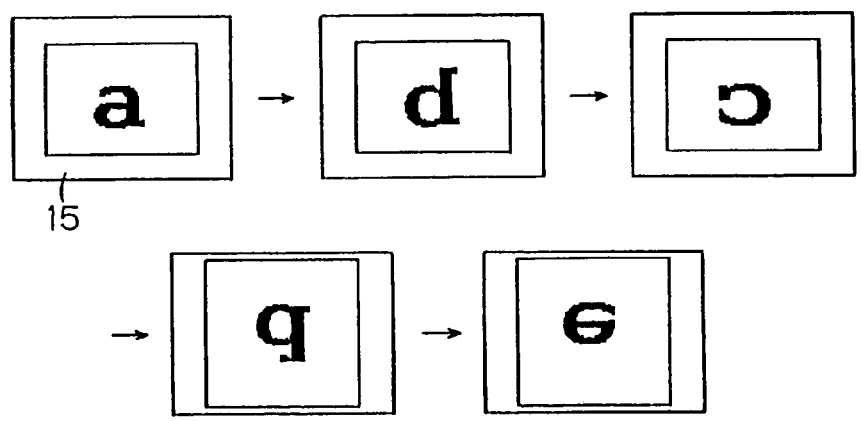
FIG. 4 is a diagram showing the images displayed on the display devices to project the images shown in FIG. 3 in the image display apparatus of the first embodiment.

FIG. 3 schematically shows an example of the images projected onto the observation room 10, and FIG. 4 shows an example of the five images displayed on the image display device 15 to project the images shown in FIG. 3. The images shown in FIG. 4 are switched in the order indicated by arrows. These first (top left) to fifth (bottom right) images are the images projected onto the screens 11a to 11e respectively. The second and third images that are projected onto the screens 11b and 11c are reversed the right side left as compared with the first image that is projected onto the screen 11a, and the fourth and fifth images that are projected onto the screens 11d and 11e are inverted upside down as compared with the first image. The images may be displayed in any other order than is specifically described above.

The optical path from the rear unit 18a of the projection optical system to the screen 11a, along which an image is projected without traveling by way of a total-reflection mirror, is shorter than the optical paths from the rear units 18b to 18e of the other four projection optical systems to the screens 11b to 11e. Accordingly, if all the projection optical systems are designed to have identical constructions, images are formed differently on the screen 11a and on the other screens 11b to 11e, making either the image formed on the screen 11a or those formed on the other screens 11b to 11e less sharp. To prevent this, in the image display apparatus 1, the rear unit 18a is designed to have a different construction so that the projection optical system including the rear unit 18a has a shorter focal length than the other projection optical systems. This makes it possible to display sharp images on all of the screens 11a to 11e.

The image display apparatus 1 can present a three-dimensional image. To achieve this, the image display device 15 is made to display images at double the time-division rate so that two images, one for the right eye and the other for the left eye, reflecting the parallax between the two eyes are projected onto each of the screens 11a and 11e. On the other hand, the observer wears goggles provided with right and left shutters that are opened and closed alternately in synchronism with the switching of the images for the right and left eyes. By making the projected image three-dimensional, it is possible to offer a very high degree of realism to the observer.

As described above, the image display apparatus 1 projects images onto five screens that are arranged so as to surround the observer, and can thus present the observer with an image covering a very wide field of view. Moreover, the image display apparatus 1 requires only one image display device to display images to be projected, and thus has a simple construction. The rear face 11f of the observation room 10 may also be used as a screen; in that case, a projector unit for projecting an image onto this screen is provided separately so that images are displayed on all of the six faces 11a to 11f of the observation room 10. Alternatively, it is also possible to build a flat, thin image display device, such as a plasma or liquid crystal display device, into the rear face 11 so that images are displayed on all of the six faces 11a to 11f of the observation room 10.

Figure 5:
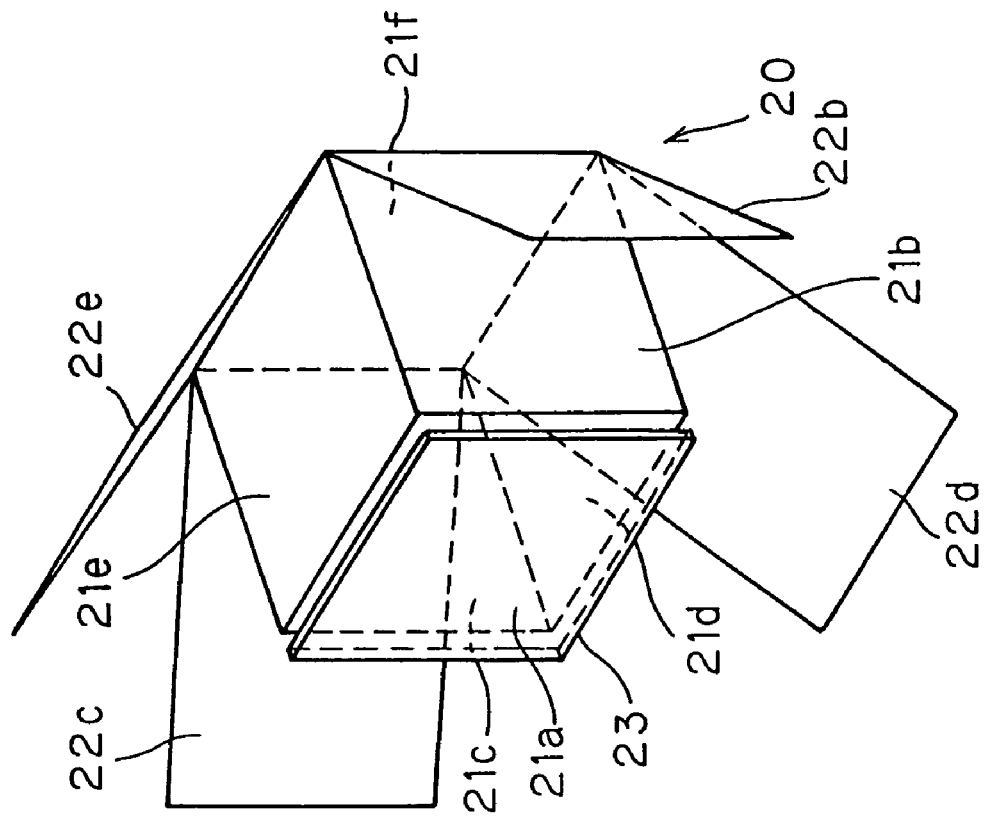
FIG. 5 is a diagram showing the outline of the overall construction of the image display apparatus of the second embodiment.
Figure 5:
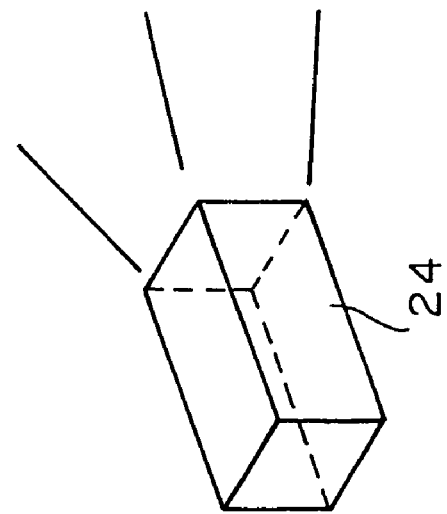

FIG. 5 shows the outline of the overall construction of the image display apparatus 2 of a second embodiment of the invention. In the image display apparatus 2, just like the image display apparatus 1 of the first embodiment, an image displayed in a projector unit 24 is projected onto an observation room 20 so that the image is presented to an observer inside the observation room 20. However, here, the projector unit 24 has a different construction from the projector unit 14 of the image display apparatus 1. Moreover, the observation room 20 has, in addition to five screens 21a, 21b, 21c, 21d, and 21e and four total-reflection mirrors 22b, 22c, 22d, and 22e, a lens 23. Except for this lens 23, the observation room 20 has the same construction as the observation room 10 of the image display apparatus 1.

Figure 6:
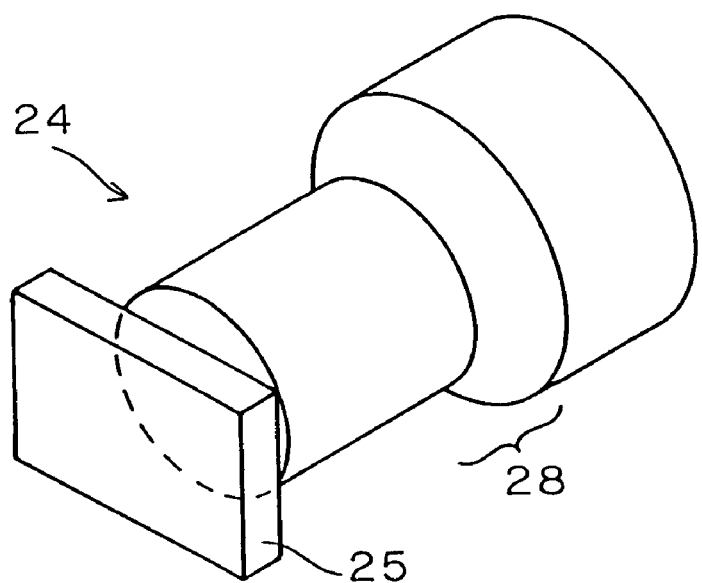
FIG. 6 is a perspective view of the projector unit of the image display apparatus of the second embodiment.

FIG. 6 shows the construction of the projector unit 24. The projector unit 24 is composed of one image display device 25 and one projection optical system 28. In the image display apparatus 2, unlike the image display apparatus 1, the entire image covering a wide space that is to be presented to the observer is displayed on the image display device 25 all at once, and the projection optical system 28 projects the image simultaneously.

Figure 7:
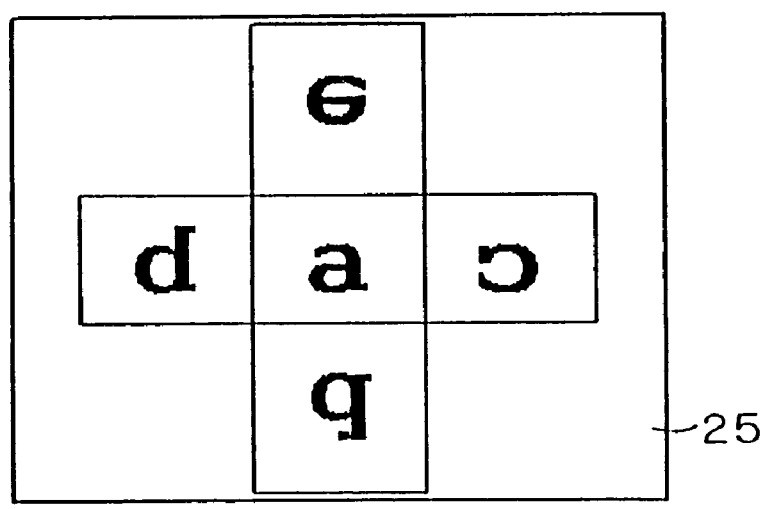
FIG. 7 is a diagram showing the images displayed on the display devices to project the images shown in FIG. 3 in the image display apparatus of the second embodiment.

The image display device 25 displays the image to be projected onto the screen 21a of the observation room 20 in a central portion of the display surface thereof, and displays the images to be projected onto the screens 21b to 21e in left-hand, right-hand, lower, and upper portions of the display surface thereof. Also here, to make the images projected onto the screens 21b to 21e by way of the total-reflection mirrors 22b and 22e continuous to the image projected directly onto the screen 21a, the images displayed in the left-hand and right-hand portions are displayed in a state reversed the right side left, and the images displayed in the upper and lower portions are displayed in a state inverted upside down. FIG. 7 shows an example of the images displayed on the image display device 25. This example shows the image displayed to project the images shown in FIG. 3 onto the observation room 20.

The projection optical system 28 is given a focal length that permits the light projected by way of the total-reflection mirrors 22b to 22e to be focused on the screens 21b and 21e. Thus, the projection optical system 28 cannot focus the light that is projected directly onto the screen 21a. It is to compensate for this difference in optical path length and thereby make the image projected onto the screen 21a sharp that the lens 23 is disposed immediately in front of the screen 21a. The lens 23 is formed as a Fresnel lens so that it is so large as to correspond to one face of the observation room 20 that houses the observer and is simultaneously as thin and light as possible.

It is also possible to give the projection optical system 28 a focal length that is adjusted to the screen 21a and provide lenses for compensating the optical path lengths between the total-reflection mirrors 22b to 22e and the screens 21b to 21e or between the total-reflection mirrors 22b to 22e and the projection optical system 28. Also in that case, it is preferable to form those lenses as Fresnel lenses.

Moreover, as described previously in connection with the first embodiment, it is possible to make the projected image three-dimensional by displaying two images, one for the right eye and the other for the left eye, reflecting the parallax between the two eyes on a time-division basis. This helps obtain a very high degree of realism.

The image display apparatus 2 of this embodiment requires only one image display device and in addition only one projection optical system, and thus has a simpler construction than the image display apparatus 1 of the first embodiment. Also here, it is possible to display images on all of the six faces 21a to 21f of the observation room 20 in the manners described previously in connection with the first embodiment.

Figure 8A:
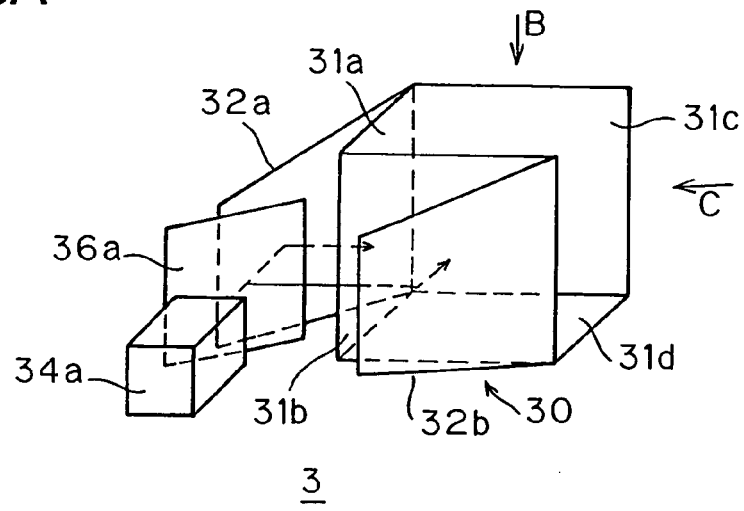
FIGS. 8A, 8B, and 8C are diagrams showing the outline of the overall construction of the image display apparatus of a third embodiment of the invention.
Figure 8B:
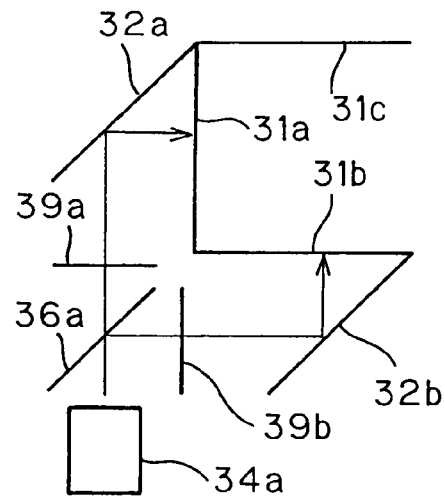
Figure 8C:
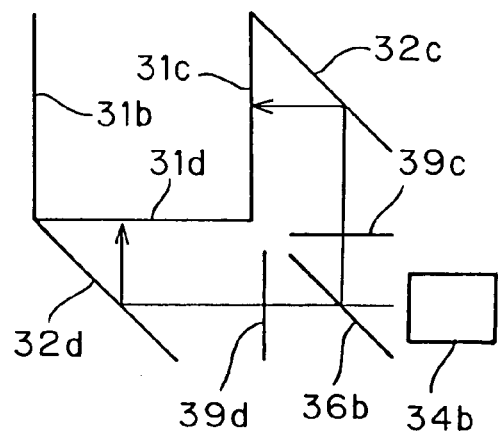

FIGS. 8A, 8B, and 8C show the outline of the overall construction of the image display apparatus 3 of a third embodiment of the invention. FIG. 8A is a perspective view of the image display apparatus 3, FIG. 8B is a top view thereof as seen from the direction indicated by arrow B shown in FIG. 8A, and FIG. 8C is a side view thereof as seen from the direction indicated by arrow C shown in FIG. 8A. The image display apparatus 3 has an observation room 30, which has the shape of a hollow rectangular parallelepiped with its ceiling face and one of its side faces removed. As with the observation room 10 of the image display apparatus 1, also here, the front face 31a, the left and right side faces 31b and 31c, and the floor face 31d of the observation room 30 are formed as transmissive, dispersive screens.

To project images onto the four screens 31a to 31d, the image display apparatus 3 is provided with two projector units 34a and 34b. Although not illustrated, the projector units 34a and 34b each have one image display device and one projection optical system. The image display device of the projector unit 34a displays the two images to be projected onto the screens 31a and 31b, and the image display device of the projector unit 34b displays the two images to be projected onto the screens 31c and 31d.

At the outward-facing (back) sides of the screens 31a and 31b of the observation room 30, total-reflection mirrors 32a and 32b are disposed that direct the light from the projector unit 34a to the screens 31a and 31b. Similarly, at the outward-facing (back) sides of the screens 31c and 31d of the observation room 30, total-reflection mirrors 32c and 32d are disposed that direct the light from the projector unit 34b to the screens 31c and 31d. These total-reflection mirrors 32a to 32d are so shaped as to have increasingly narrow widths toward the projector units 34a and 34b.

Between the projector unit 34a and the total-reflection mirror 32a, a half mirror 36a is disposed that transmits one half of the light from the projector unit 34a to direct it to the total-reflection mirror 32a and that reflects the other half to direct it to the total-reflection mirror 32b. Similarly, between the projector unit 34b and the total-reflection mirror 32d, a half mirror 36b is disposed that transmits one half of the light from the projector unit 34b to direct it to the total-reflection mirror 32d and that reflects the other half to direct it to the total-reflection mirror 32c.

Furthermore, in the optical paths of the light transmitted through and reflected from the half mirror 36a, shutters 39a and 39b (not shown in FIG. 8A) are disposed respectively. Similarly, in the optical paths of the light transmitted through and reflected from the half mirror 36b, shutters 39d and 39c are disposed respectively.

The image display devices of the projector units 34a and 34b, like the image display device 15 of the image display apparatus 1, display images on a time-division basis. The shutters 39a and 39b are opened and closed in synchronism with the time-division display of the projector unit 34a, and the shutters 39c and 39d are opened and closed in synchronism with the time-division display of the projector unit 34b. As a result, the images that are to be projected onto the screens 31a to 31d are projected properly onto the respective screens.

The image display apparatus 3 of this embodiment permits images to be projected onto four screens arranged so as to surround the observer by the use of two image display devices and two projection optical systems. Thus, this image display apparatus 3 has a simple construction but nevertheless offers an image covering a wide field of view. It is also possible to additionally provide another set of elements like the screens 31a and 31b, the projector unit 34a, the mirrors 32a, 32b, and 36a, and the shutters 39a and 39b so that images are displayed on all of the six faces of the observation room.

Figure 9:
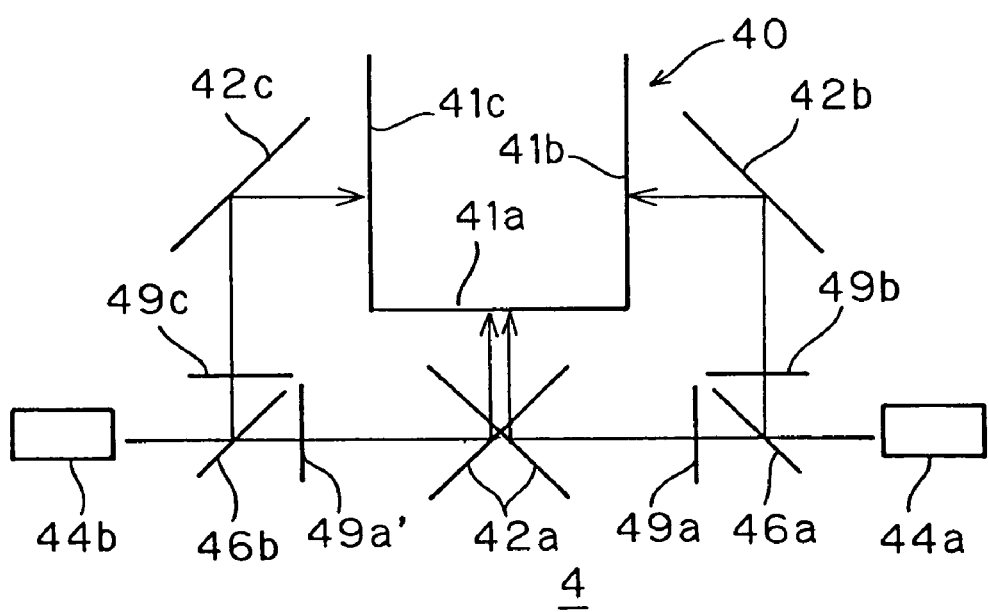
FIG. 9 is a diagram showing the outline of the overall construction of the image display apparatus of a fourth embodiment of the invention.

FIG. 9 shows the outline of the overall construction of the image display apparatus 4 of a fourth embodiment of the invention. FIG. 9 is a top view of the image display apparatus 4. The image display apparatus 4 has an observation room 40, which has the shape of a hollow rectangular parallelepiped with its floor and ceiling faces and one of its side faces removed. As with the observation room 10 of the image display apparatus 1, also here, the front face 41a and the left and right side faces 41b and 41c of the observation room 40 are formed as transmissive, dispersive screens.

To project images onto the three screens 41a to 41c, the image display apparatus 4 is provided with two projector units 44a and 44b. Although not illustrated, the projector units 44a and 44b each have one image display device and one projection optical system. The image display device of the projector unit 44a displays the two images to be projected onto the screens 41a and 41b, and the image display device of the projector unit 44b displays the two images to be projected onto the screens 41a and 41c. That is, in the image display apparatus 4, the images from the two projector units 44a and 44b are projected onto the front screen 41a.

At the outward-facing (back) sides of the screens 41b and 41c of the observation room 40, total-reflection mirrors 42b and 42c are disposed that direct the light from the projector units 44a and 44b to the screens 41b and 41c. On the other hand, at the outward-facing (back) side of the screen 41a of the observation room 40, a cross half mirror 42a is disposed that directs the light from the projector units 44a and 44b to the screen 41a.

Moreover, between the projector unit 44a and the cross half mirror 42a, a half mirror 46a is disposed that transmits one half of the light from the projector unit 44a to direct it to the cross half mirror 42a and that reflects the other half to direct it to the total-reflection mirror 42b. Similarly, between the projector unit 44b and the cross half 42a, a half mirror 46b is disposed that transmits one half of the light from the projector unit 44b to direct it to the cross half mirror 42a and that reflects the other half to direct it to the total-reflection mirror 42c.

Furthermore, in the optical paths of the light transmitted through and reflected from the half mirror 46a, shutters 49a and 49b are disposed respectively, and, in the optical paths of the light transmitted through and reflected from the half mirror 46b, shutters 49a' and 49c are disposed respectively.

The image display devices of the projector units 44a and 44b, like the image display device 15 of the image display apparatus 1, display images on a time-division basis. In addition, the projector units 44a and 44b operate in synchronism with each other so that the image from the projector unit 44a and the image from the projector unit 44b are projected alternately onto the screen 41a. The shutters 49a and 49b are opened and closed in synchronism with the time-division display of the projector unit 44a, and the shutters 49a' and 49c are opened and closed in synchronism with the time-division display of the projector unit 44b. As a result, the images that are to be projected onto the screens 41a to 41c are projected properly onto the respective screens.

With this construction, by introducing an appropriate parallax between the image projected from one projector unit 44a onto the screen 41a and the image projected from the other projector unit 44b onto the screen 41a, and by making the observer wear goggles provided with right and left shutters that are opened and closed alternately in synchronism with the time-division display of the projector units 44a and 44b, it is possible to present a three-dimensional image readily. In that case, only the image displayed on one screen 41a is made three-dimensional, and this helps greatly simplify the control required as compared with cases where the images displayed on all the screens are made three-dimensional. Simply by making only the image presented in front of the observer three-dimensional, it is possible to greatly enhance the realism offered to the observer.

By providing another complete set of elements as described above, it is possible to display images on all of the six faces of the observation room.

Figure 10A:
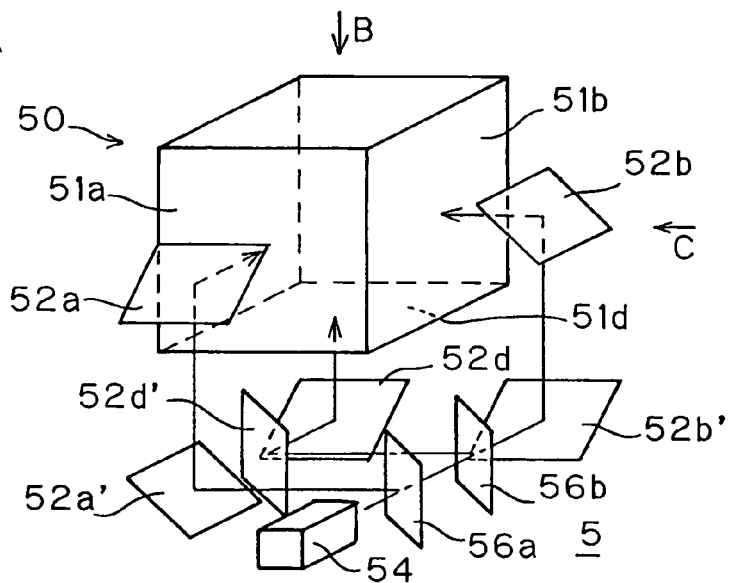
FIGS. 10A, 10B, and 10C are diagrams showing the outline of the overall construction of the image display apparatus of a fifth embodiment of the invention.
Figure 10B:
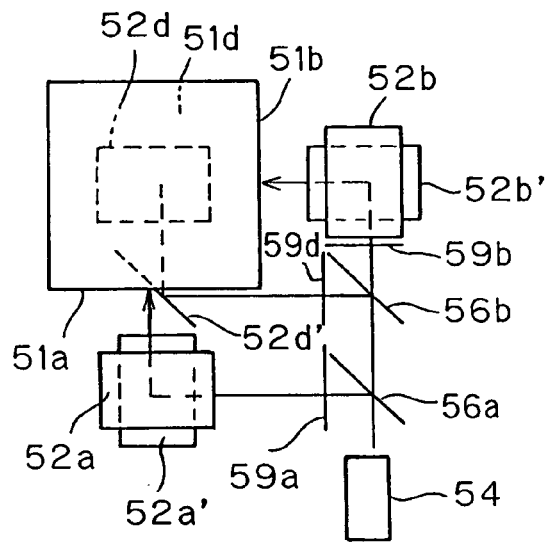
Figure 10C:
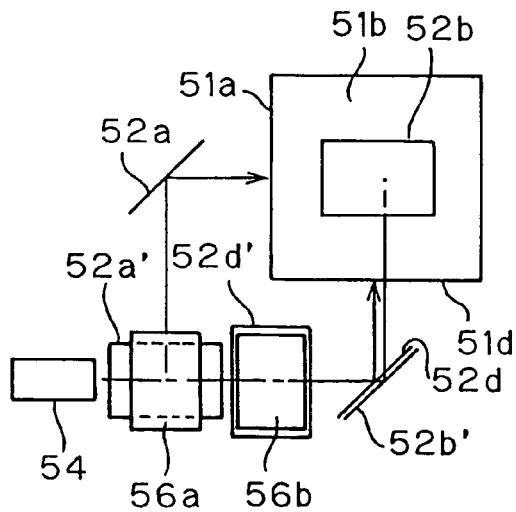

FIGS. 10A, 10B, and 10C show the outline of the overall construction of the image display apparatus 5 of a fifth embodiment of the invention. FIG. 10A is a perspective view of the image display apparatus 5, FIG. 10B is a top view thereof as seen from the direction indicated by arrow B shown in FIG. 10A, and FIG. 10C is a side view thereof as seen from the direction indicated by arrow C shown in FIG. 10A. The image display apparatus 5 has an observation room 50, which has the shape of a hollow rectangular parallelepiped. The front face 51a, one side face 51b, and the floor face 51d of the observation room 50 are formed as transmissive, dispersive screens.

To project images onto the three screens 51a, 51b, and 51d, the image display apparatus 5 is provided with one projector unit 54. Although not illustrated, the projector unit 54 has one image display device and one projection optical system. Of the images that the image display device of the projector unit 54 displays, the two that are to be projected onto the screens 51a and 51b represent a space extending continuously from the front to the side, and thus they contain no clear boundary that divides, for example, a part thereof representing a space located at the front and a part thereof representing a space located at the side. The observer normally observes the projected image in a position just facing the boundary between the screens 51a and 51b.

To split the light from the projector unit 54 into three light beams and direct them to the screens 51a, 51b, and 51d, the image display apparatus 5 is provided with two half mirrors 56a and 56b and six total-reflection mirrors 52a, 52a', 52b, 52b', 52d, and 52d'. Part of the light from the projector unit 54 is reflected from the half mirror 56a, is then reflected from the total-reflection mirror 52a' and then from the total-reflection mirror 52a, and is directed to the screen 51a. Part of the light transmitted through the half mirror 56a is reflected from the half mirror 56b, is reflected from the total-reflection mirror 52d' and then from the total-reflection mirror 52d, and is directed to the screen 51d. The light transmitted through the half mirror 56b is reflected from the total-reflection mirror 52b' and 52b, and is directed to the screen 51b.

In the optical path of the light reflected from the half mirror 56a is disposed a shutter 59a (not shown in FIGS. 10A and 10C). Moreover, in the optical paths of the light transmitted through and reflected from the half mirror 56b are disposed shutters 59b and 59d respectively (not shown in FIGS. 10A and 10C).

The image display device of the projector unit 54, like the image display device 15 of the image display apparatus 1, display images on a time-division basis. The shutters 59a, 59b, and 59d are opened and closed in synchronism with the time-division display of the projector unit 54, and thereby the images that are to be projected onto the screens 51a, 51b, and 51d are projected properly onto the respective screens.

Also in the image display apparatus 5, it is possible to make the projected image three-dimensional by making the image display device display images at double the time-division rate so that two images, one for the right eye and the other for the left eye, reflecting the parallax between the two eyes are displayed on each screen. This helps further enhance the realism offered to the observer. Moreover, by forming also the other three faces of the observation room 50 as screens and providing another set of a projector unit and other elements as described above, it is possible to display images onto all of the six faces of the observation room 50.

Figure 11:
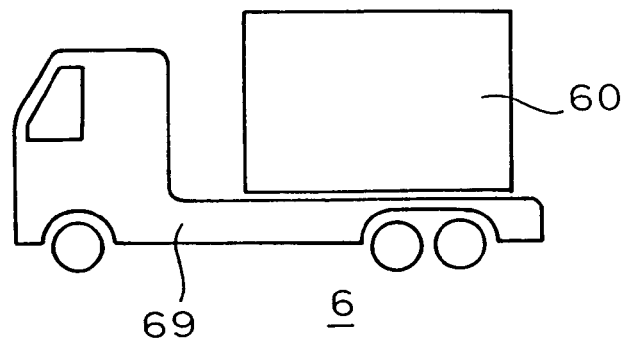
FIG. 11 is a diagram showing the outline of the overall construction of the image display apparatus of a sixth embodiment of the invention.

FIG. 11 shows the outline of the overall construction of the image display apparatus 6 of a sixth embodiment of the invention. In the image display apparatus 6, an observation room 60 is mounted on a motor vehicle so as to be mobile. The image display apparatus 6 is of a direct-display type in which the wall faces of the observation room 60 themselves display images. The observation room 60 has the shape of a hollow rectangular parallelepiped, and is so large as to house an observer in a standing position. The four side faces, floor face, and ceiling face of the observation room 60 each have a plurality of flat, thin image display devices, such as plasma or liquid crystal display devices, built therein. Of the four side faces, the one located at the rear end of the motor vehicle, or one of the image display devices built therein, is made openable so as to serve as a door that permits the observer in and out.

Figure 12:
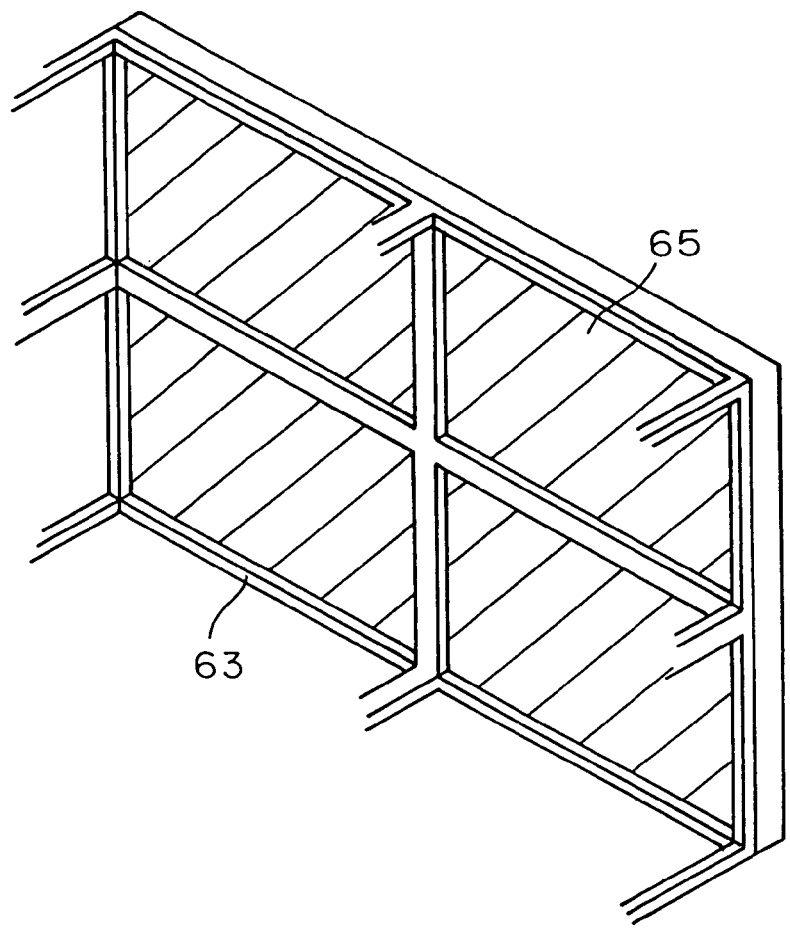
FIG. 12 is a perspective view of a side face of the observation room of the image display apparatus of the sixth embodiment.
Figure 13:
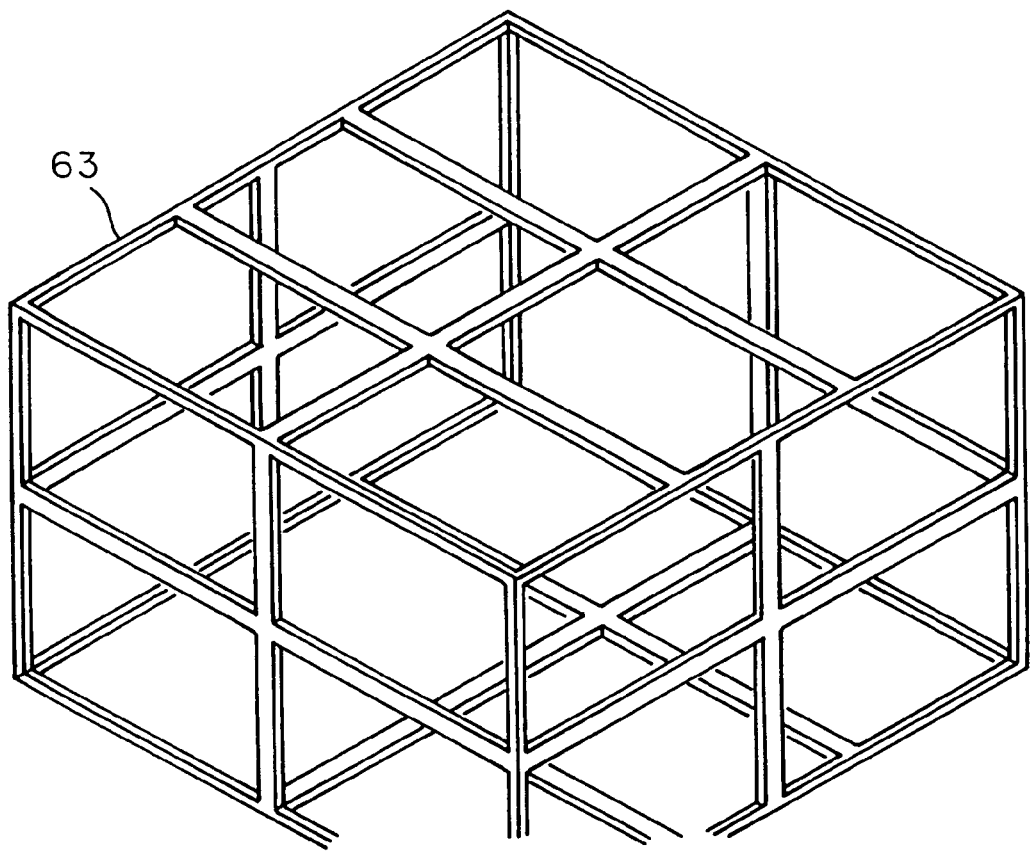
FIG. 13 is a perspective view of the frame member of the observation room of the image display apparatus of the sixth embodiment.
Figure 14:
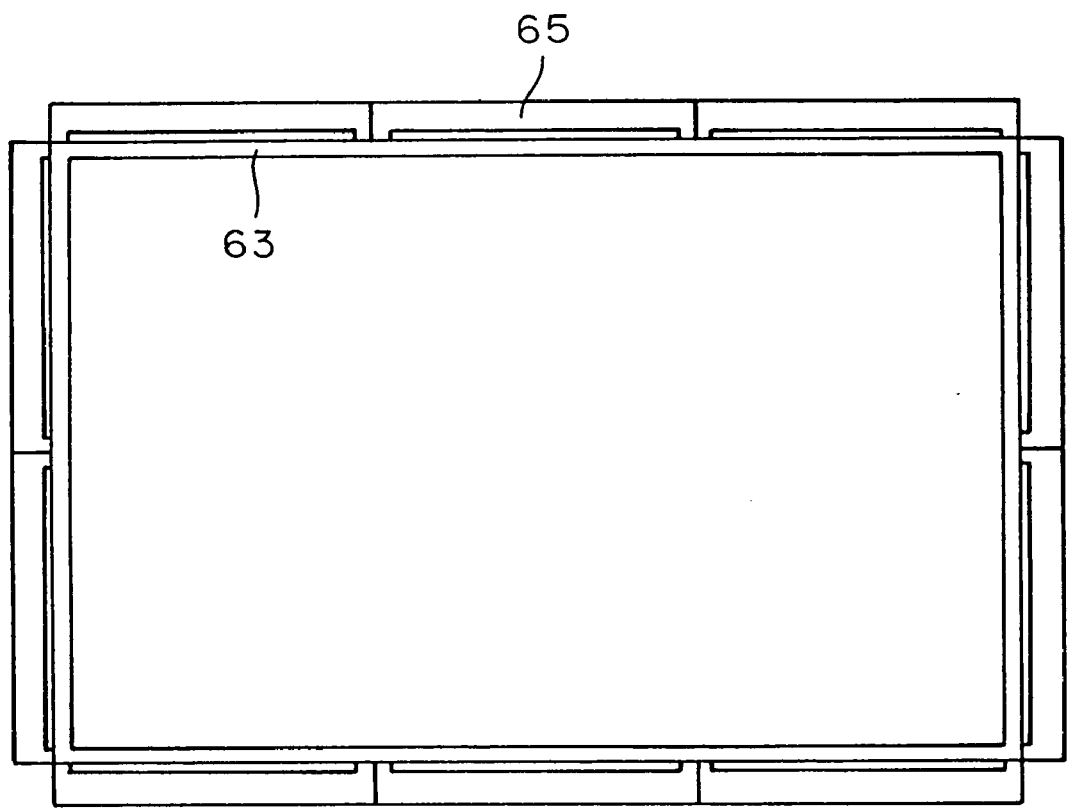
FIG. 14 is a horizontal sectional view of the frame member of the observation room of the image display apparatus of the sixth embodiment.

FIG. 12 is a perspective view of one side face of the observation room 60. The observation room 60 has a frame member 63, to which a plurality of image display devices 65 are fixed. A perspective view of the frame member 63 and a horizontal sectional view thereof with image display devices fitted thereto are shown in FIGS. 13 and 14 respectively. On all faces, the image display devices 65 are fitted to the frame member 63 from outside. The floor face is covered all over with a scratch-resistant, transparent plate, which serves to protect the image display devices 65 built in the floor face.

Figure 15:
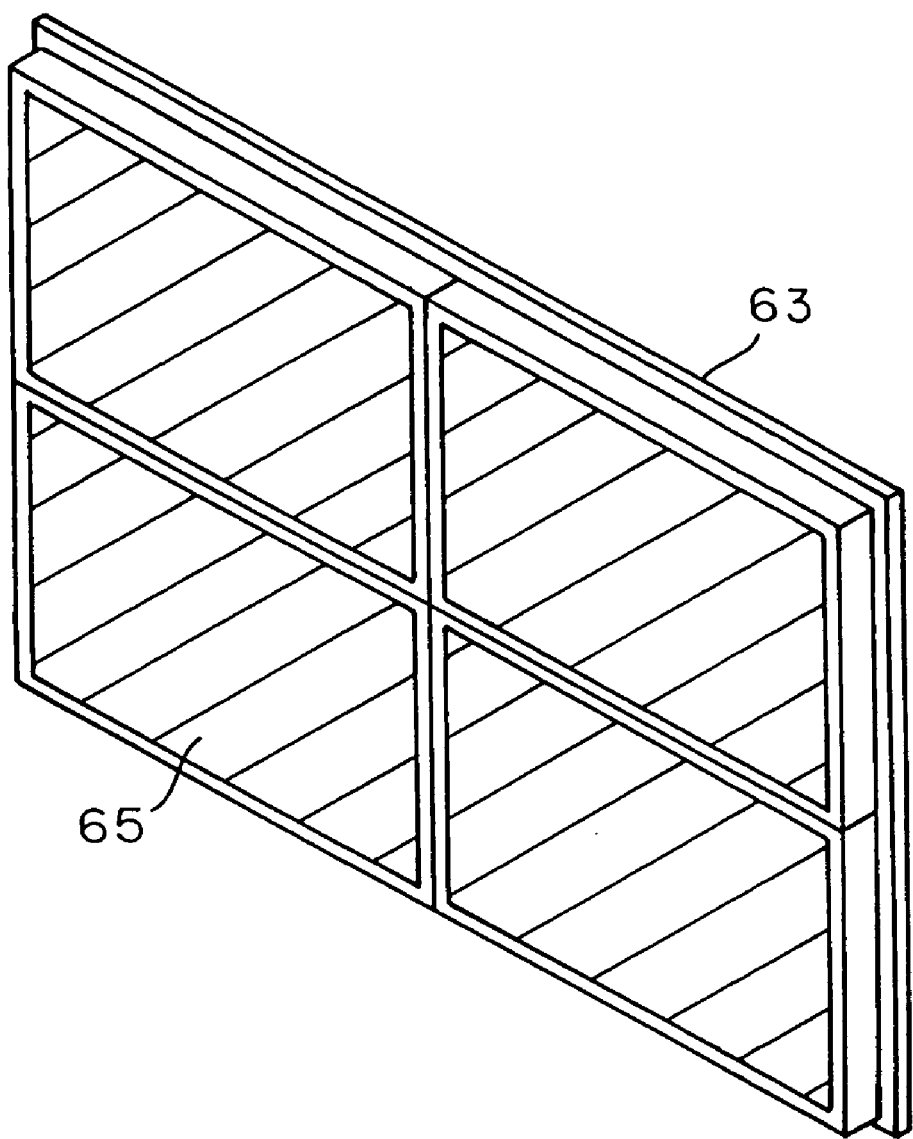
FIG. 15 is a perspective view of a side face of a modified example of the observation room.
Figure 16:
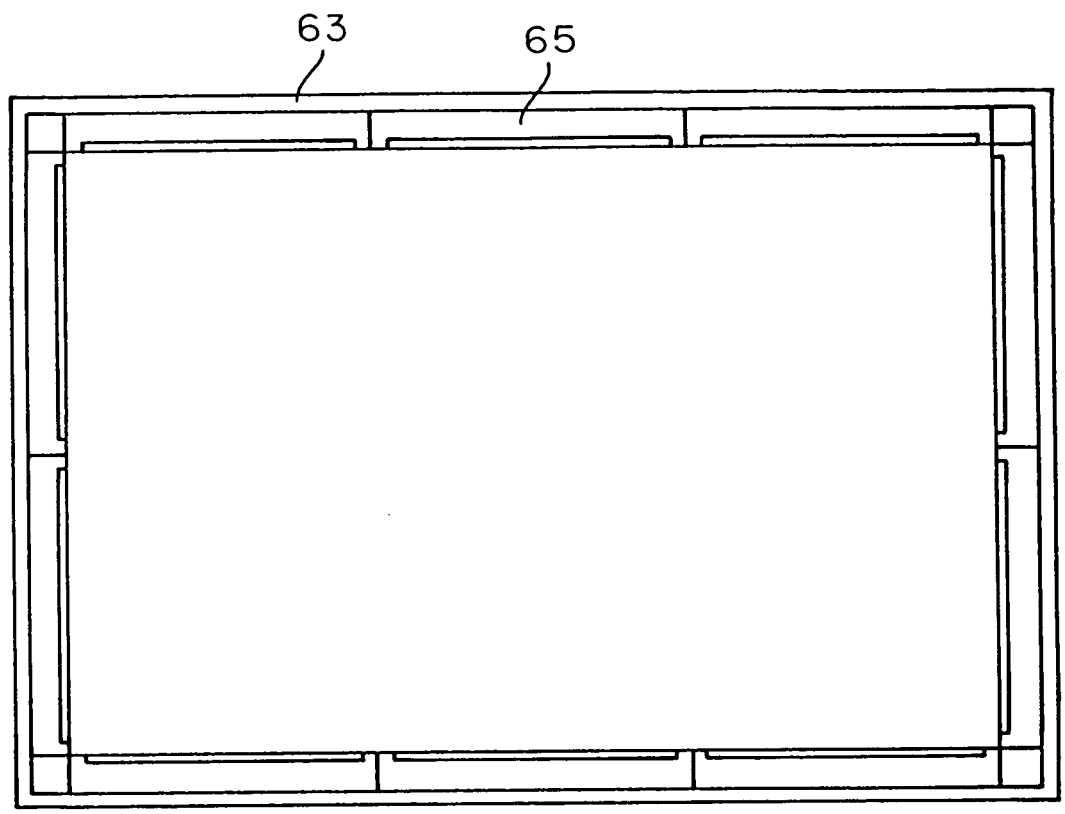
FIG. 16 is a horizontal sectional view of the frame member of a modified example of the observation room.

The image display devices 65 may be fitted to the frame member 63 from inside. A perspective view of one side face of the observation room 60 and a sectional view of the frame member 65 when the image display devices 65 are fitted from inside are shown in FIGS. 15 and 16 respectively. Since the frame member 63 has its own thickness, when the image display devices 65 are fitted to the frame member 63 from outside, there is a possibility that the images displayed on the image display devices 65 suffer vignetting in their peripheral portions depending on the angle of the line of sight of the observer. By contrast, when the image display devices 65 are fitted to the frame member 63 from inside, there is no possibility at all of such vignetting caused by the frame member 63. Moreover, even if the frame member 63 is made wider to ease the fitting of the image display devices 65, this has no effect on the displayed images.

The image display apparatus 6 of this embodiment is mobile, and can therefore present images with a high degree of realism at various locations. Although here the observation room is built as a direct-display type, it may be built as a projection type. In that case, as described previously in connection with the first to fifth embodiments, it is possible to simplify the construction by making the number of image display devices smaller than the number of screens.

Figure 17:
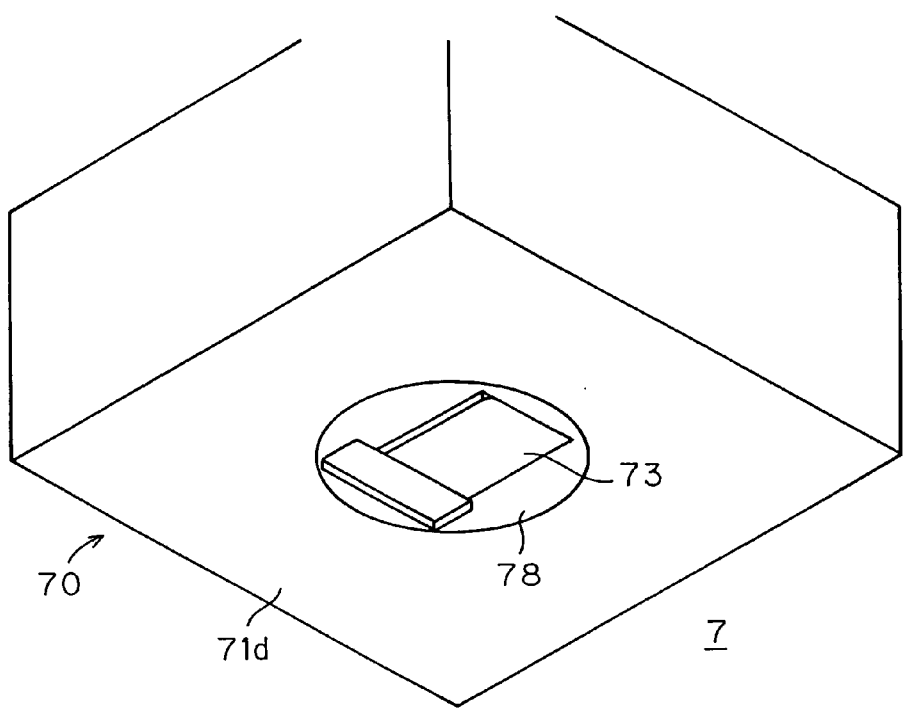
FIG. 17 is a perspective view showing the outline of the construction of the image display apparatus of a seventh embodiment of the invention.
Figure 18:
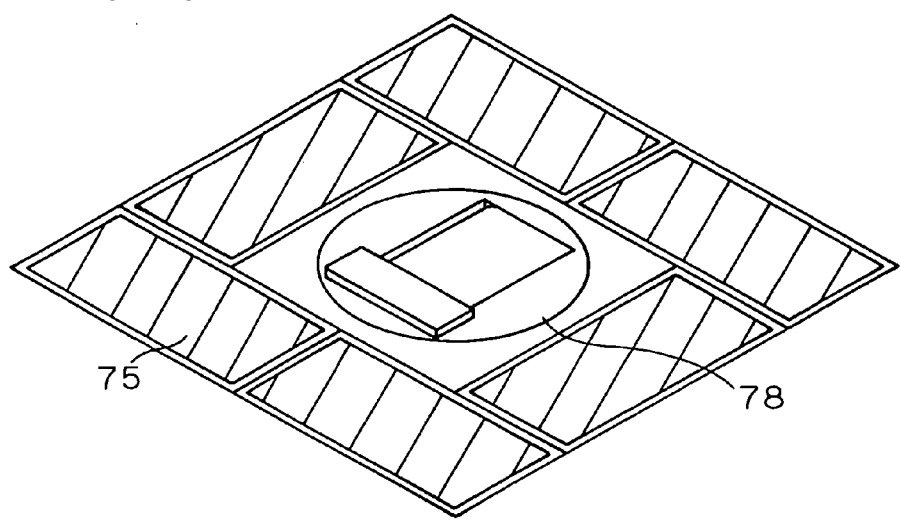
FIG. 18 is a perspective view of the floor face of the image display apparatus of the seventh embodiment.

FIG. 17 shows the outline of the construction of the image display apparatus 7 of a seventh embodiment of the invention. This image display apparatus 7 has an observation room 70, which has the shape of a hollow rectangular parallelepiped. FIG. 17 is a perspective view showing the inside of the observation room 70. The six faces of the observation room 70 have flat, thin image display devices, such as plasma or liquid crystal display devices, built therein. At the center of the floor face 71d is provided a turntable 78 fitted with a treadmill 73. As shown in FIG. 18, on the floor face 71d, the image display devices 75 are arranged around the turntable 78.

Figure 19:
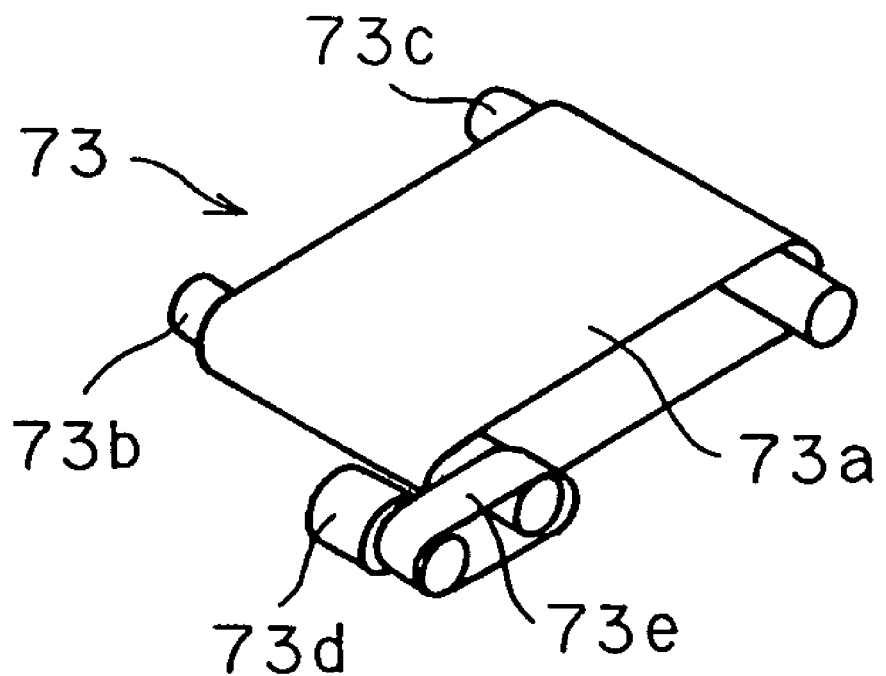
FIG. 19 is a perspective view of the treadmill of the image display apparatus of the seventh embodiment.

FIG. 19 shows the treadmill 73. The treadmill 73 is composed of two rollers 73b and 73c arranged parallel to each other, a belt 73a suspended on and over the interval between the rollers 73b and 73c, a motor 73d for rotating the roller 73b, and a belt 73e that transmits the rotating of the motor 73d to the roller 73b.

Figure 20A:
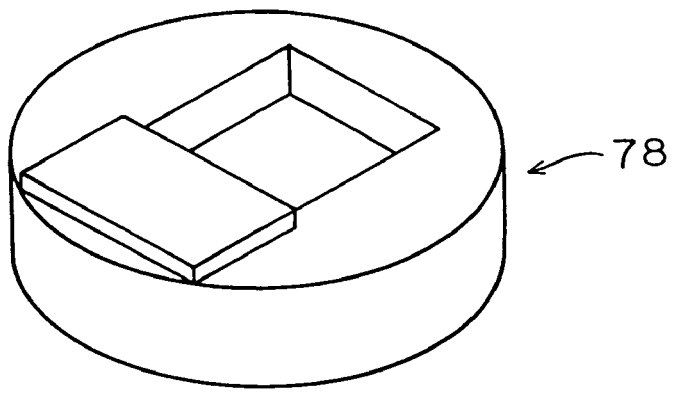
FIGS. 20A, 20B, and 20C are perspective views of the turntable of the image display apparatus of the seventh embodiment.
Figure 20B:
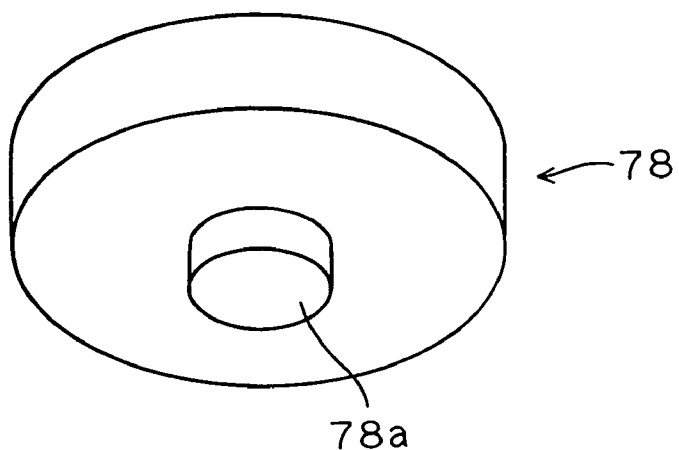
Figure 20C:
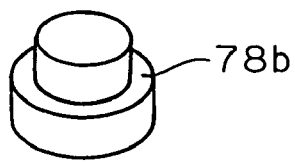

FIGS. 20A, 20B, and 20C show the turntable 78. FIGS. 20A and 20B are perspective views of the turntable 78 as seen obliquely from above and obliquely from below respectively. The turntable 78 has a cylindrical projection 78a provided at its bottom, and this projection 78a engages with a driving member 78b that rotates the turntable 78. FIG. 20C is a perspective view of the driving member 78b as seen obliquely from above. The driving member 78b is fed with a rotating force from a motor (not shown).

The observer rides on the belt 73a of the treadmill 73 while observing the images displayed on the faces of the observation room 70. The treadmill 73 and the turntable 78 are designed to operate in accordance with remote control by the observer, and the rotation speed of the belt 73a and the orientation angle of the turntable 78 can be set at will by the observer. Moreover, the images displayed on the image display devices 75 on the observation room faces are varied in accordance with the rotation speed of the belt 73a and the orientation of the turntable 78.

In this image display apparatus 7 constructed as described above, the observer, while acting like walking at speed corresponding to the rotation speed of the belt 73a, has a sensation that he is actually walking, without traveling any distance at all in reality, on the basis of his own movement and the varying images. Moreover, by varying the orientation of the turntable while acting like walking, the observer can also have a sensation that he is turning his course. It is possible to additionally provide a walking movement detector that detects the walking pace and the foot direction of the observer so that the rotation speed of the belt 73a and the orientation of the turntable 78 are varied in accordance with the detection results obtained from that detector. This makes it possible to offer a more natural sensation of walking to the observer.

The image display apparatus 7 of this embodiment also is built as a direct-display type; however, it is also possible to combine a turntable fitted with a treadmill with a projection-type image display apparatus that uses fewer image display devices than screens as described previously in connection with the first to fifth embodiments. Moreover, it is also possible, as in the sixth embodiment, to mount the image display apparatus on a motor vehicle so as to make it mobile.

Figure 21:
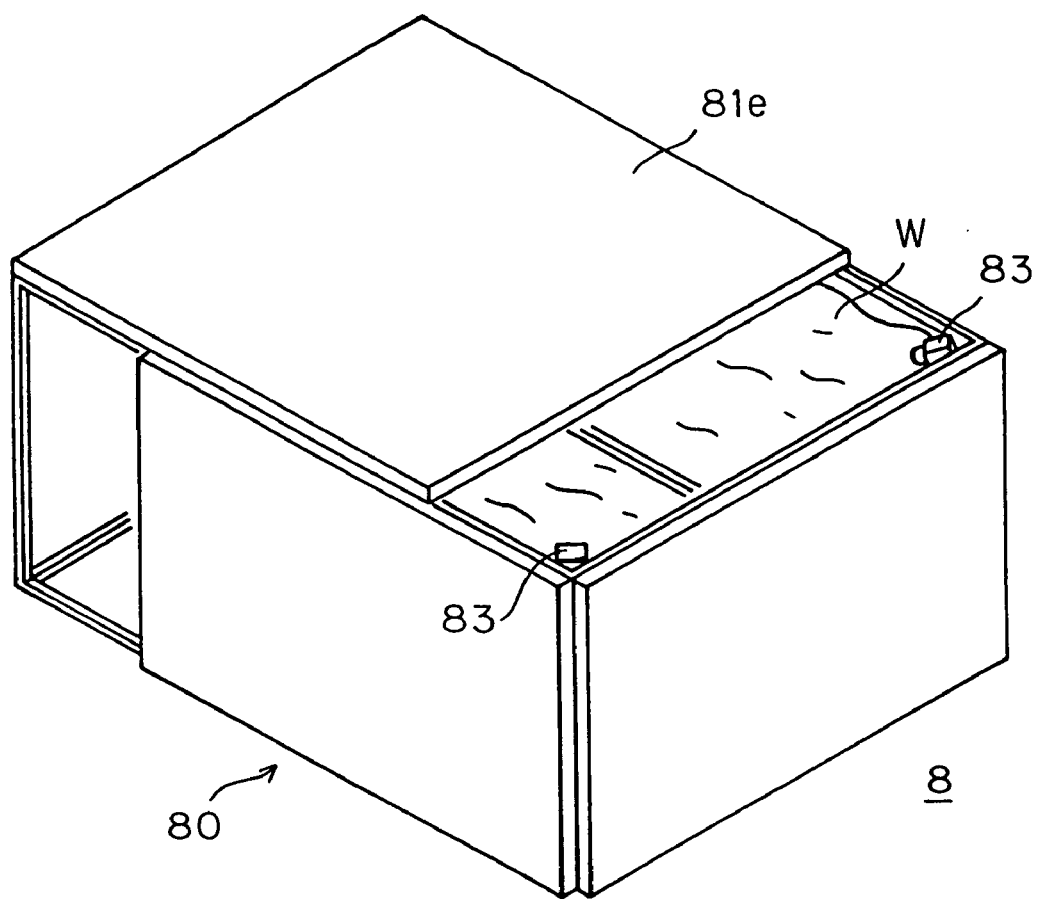
FIG. 21 is a perspective view showing the outline of the construction of the image display apparatus of an eighth embodiment of the invention.

FIG. 21 shows the outline of the construction of the image display apparatus 8 of an eighth embodiment of the invention. The image display apparatus 8 has an observation room 80, which has the shape of a hollow rectangular parallelepiped. FIG. 21 is a perspective view showing the external appearance of the observation room 80. The six faces of the observation room 80 have flat, thin image display devices, such as plasma or liquid crystal display devices, built therein. In this image display apparatus 8, the observation room 80 is filled with water W, and the observer observes images from underwater. The observation room 80 is designed to withstand water pressure, and its floor face and four side faces are made water-tight.

Figure 22:
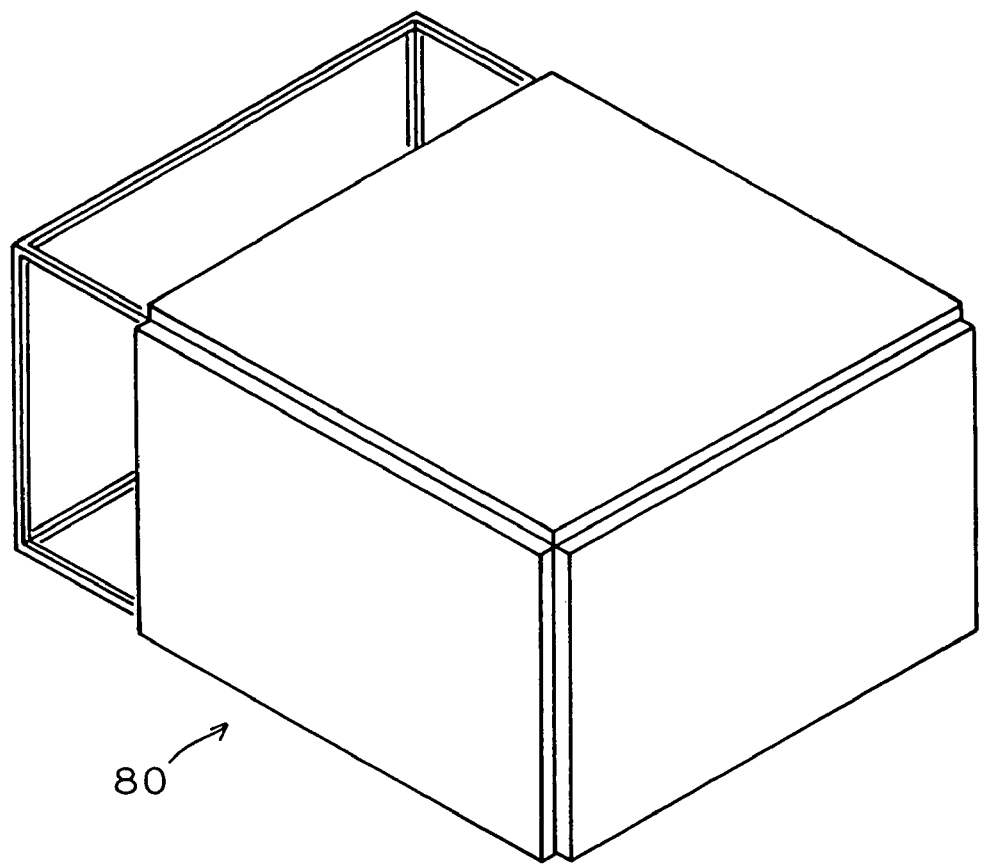
FIG. 22 is a perspective view of the observation room, in its closed state, of the image display apparatus of the eighth embodiment.

The ceiling face 81e of the observation room 80 is movable in a horizontal direction so that, after the observer has entered the observation room 80, the ceiling face 81e is moved so as to close the entire observation room 80. FIG. 22 shows the observation room 80 in its closed state. To permit the observer inside the observation room 80 to be monitored even when the observation room 80 is closed, monitoring cameras 83 are provided inside the observation room 80. This permits, in case of an accident to the observer, the ceiling face 81e to be moved quickly so that the observer may be rescued out of the observation room 80. This makes the image display apparatus 8 highly safe.

In the image display apparatus 8, by displaying an image representing an underwater scene, it is possible to offer the observer a sensation that he is in the see. Meanwhile, the observer feels resistance of water and buoyancy, which adds to the realism offered to the observer.

The water level inside the observation room 80 may be set freely; that is, it may be such that the water surface reaches the ceiling face 81*e*, or such that a space is left between the water surface and the ceiling face 81*e*. In the former case, the observer uses a breathing assist apparatus while observing images. When the water level is set so low as to leave a space between the water surface and the ceiling face 81*e*, the image displayed on the ceiling face 81*e* is disturbed by irregular reflection on the water surface, which acts to enhance the sensation that the observer is looking into the air from underwater.

When the observer wears an appropriate weight, the buoyancy of water is canceled by gravity. This offers the observer a floating sensation. Meanwhile, by displaying an image representing outer space in the observation room 80, it is possible to offer the observer a sensation that he is in gravity-free space. In that case, to prevent irregular reflection on the water surface, it is preferable that the water level be so set that the water surface reaches the ceiling face 81*e*.

Here, the observation room 80 is opened and closed by moving the ceiling face 81*e* in a horizontal direction; however, it may be opened and closed in any other manner. For example, part of the ceiling face 81*e* is formed into a door that rotates about a level axis. Alternatively, part of the ceiling face 81*e* is left open all the time. In these constructions, the ceiling face 81*e* may be designed to be movable up and down. This makes it possible to vary the distance from the water surface to the ceiling face 81*e* not by varying the water level but by varying the level of the ceiling face 81*e*.

The image display apparatus 8 of this embodiment also is built as a direct-display type; however, it is also possible to fill the observation room of a projection-type image display apparatus with water so that images can be observed from underwater. In that case, for example, wall faces are made of a highly strong transparent material so as to withstand water pressure, and screens are arranged on the outward-facing (back) sides of those wall faces. Moreover, it is possible to simplify the construction by making the number of image display devices smaller than the number of screens as described previously in connection with the first to fifth embodiments. Moreover, it is also possible to mount the image display apparatus on a motor vehicle so as to make it mobile.

Figure 23:
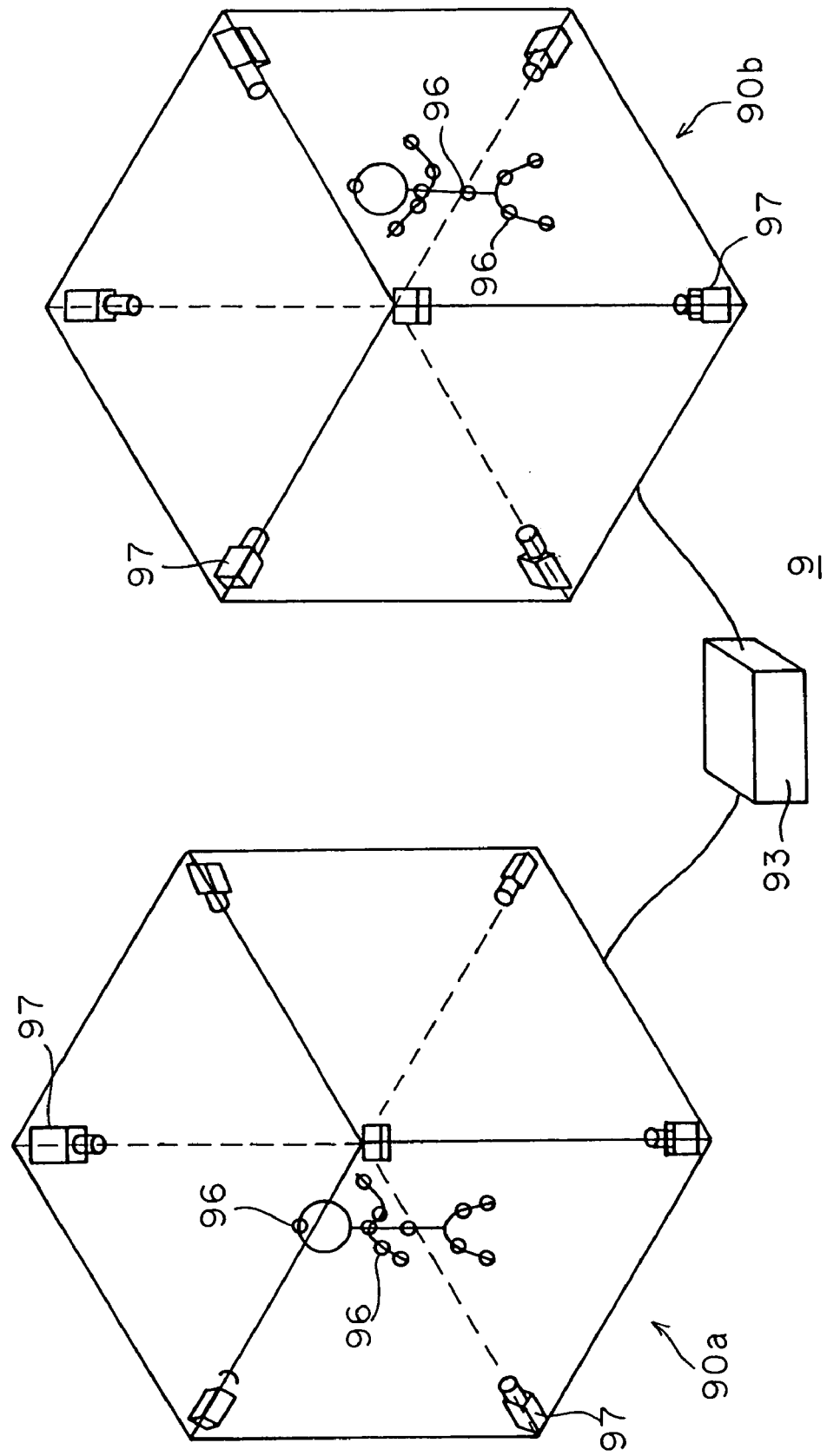
FIG. 23 is a perspective view showing the outline of the construction of the image display apparatus of a ninth embodiment of the invention.

FIG. 23 shows the outline of the overall construction of the image display apparatus 9 of a ninth embodiment of the invention. The image display apparatus 9 includes two observation rooms 90*a* and 90*b* and one controller 93. In FIG. 23, the observation rooms 90*a* and 90*b* are illustrated as being see-through. The observation rooms 90*a* and 90*b* each have the shape of a hollow rectangular parallelepiped, and each have six faces on which images are displayed. The observation rooms 90*a* and 90*b* each house one observer who observes the images displayed therein.

The controller 93 controls the images displayed in the observation rooms 90*a* and 90*b*. Specifically, the controller 93 generates images common to the two observation rooms 90*a* and 90*b* in accordance with the position of the observers inside the individual observation rooms 90*a* and g0b, then adds to the image for each observation room an image representing the observer inside the other observation room, and then displays the resulting images in the observation rooms 90*a* and g0b. That is, the images displayed in the observation rooms 90*a* and g0b are almost the same, except that they include some difference resulting from the difference in position of the observers inside the observation rooms 90*a* and 90*b*, and that the image displayed in the observation room 90*a* includes the image of the observer inside the observation room 90*b* and the image displayed in the observation room 90*b* includes the image of the observer inside the observation room 90*a*.

In the image displayed in each of the observation rooms 90*a* and 90*b*, the image included therein of the observer inside the other observation room is not fixed, but is varied according to the movement of that observer, i.e. according to the positions of various parts of his body. To permit detection of the positions of various parts of their bodies, the observers each wear signal generators 96, such as supersonic wave oscillators or infrared light emitters, at their head, shoulders, waist, arms, hand, legs, feet, and others, and in addition, in the corners of the observation rooms 90*a* and 90*b*, signal detectors 97, such as supersonic wave sensors or infrared light sensors, corresponding to the signal generators 96 are arranged. The different signal generators 96 worn by one observer generate signals having different characteristics in terms of their frequency, wavelength, number of pulses, and others so that the individual signal detectors 97 can identify the signals output from the corresponding signal generators 96. The signal detectors 97, on the basis of the signals they detect, identify the positions of the individual signal generators 96, and feed their positions to the controller 93.

The controller 93 is thus fed with the positions of the individual signal generators 96 from eight signal detectors 97, and, for each of the signal generators 96, calculates the average of eight positions to determine the position of that signal generator, i.e. the position of the part of the observer's body corresponding to that signal generator. Depending on the posture and orientation of the observer, it is not always possible for all of the signal detectors 97 to detect the signals from all of the signal generators 96. However, the signal from any of the signal generators 96 can be detected by at least one of the signal detectors 97 at any time, and therefore it is possible to detect the positions of various parts of the observers' bodies all the time.

On the basis of the thus detected positions of various parts of the observers' bodies, the controller 93 generates three-dimensional images of the observers. The controller 93 achieves this by first producing the skeletons that reflect the detected positions of various parts of the observers' bodies, and then subjecting the obtained skeletons to a rendering process, which produces therefrom images with sufficient fleshiness to represent the observers in their clothes. Before the observers enter the observation rooms 90*a* and 90*b*, their images are shot from a plurality of directions so that, in the rendering process, those images are referred to in order to make their images look as much like the observers themselves as possible.

Figure 24:
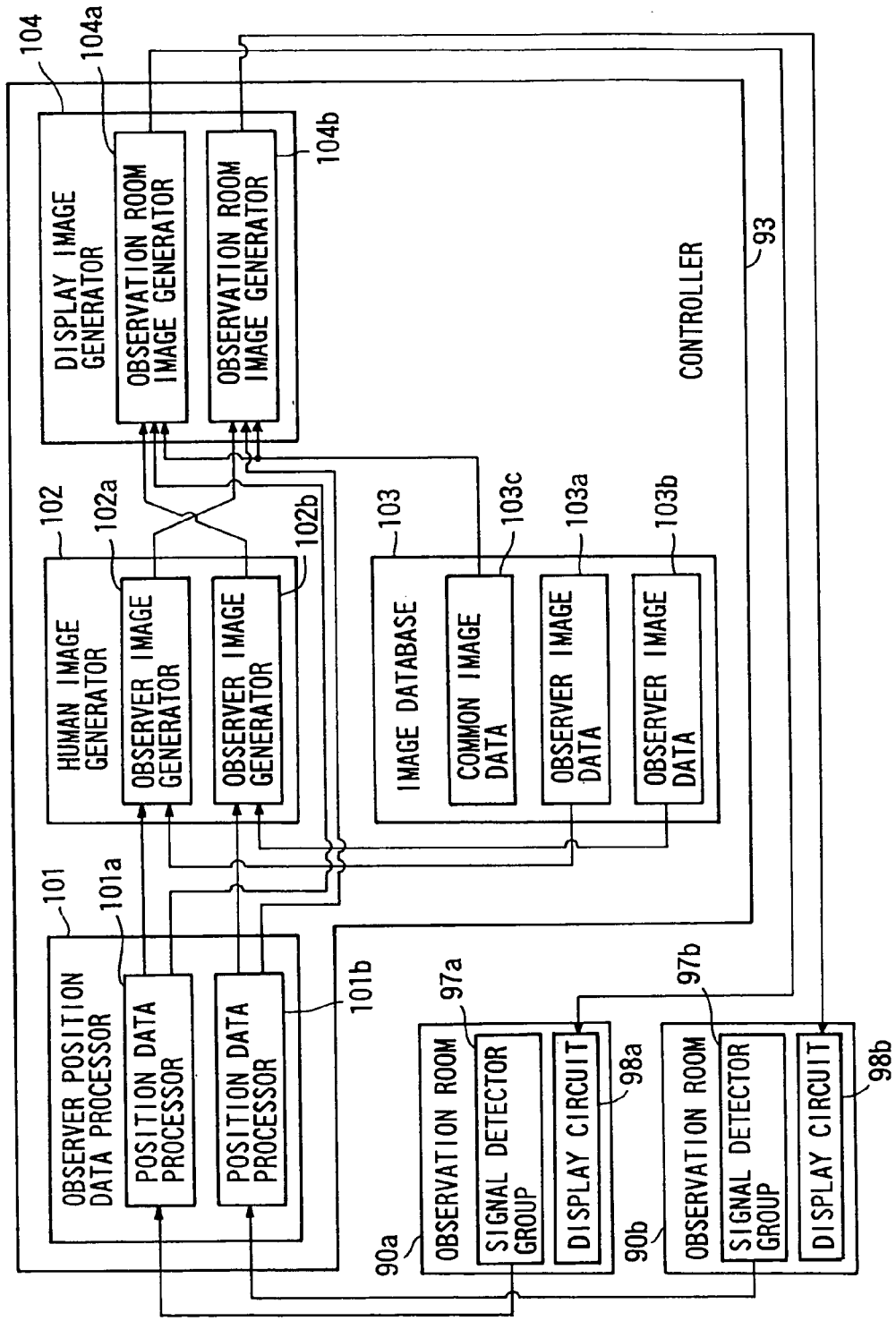
FIG. 24 is a block diagram showing the outline of the configuration of the controller of the image display apparatus of the ninth embodiment.

FIG. 24 shows the outline of the configuration of the controller 93. The controller 93 includes an observer position data processor 101 that determines the positions of various parts of the observers' bodies by processing the position data fed from the signal detectors 97, a human image generator 102 that generates images representing the observers on the basis of the thus determined positions, an image database 103 in which texture data necessary to produce images is stored, and a display image generator 104 that generates images to be displayed in the individual observation rooms.

The observer position data processor 101 is composed of a position data processor 101*a* for determining the position of the observer inside one observation room 90*a* and a position data processor 101*b* for determining the position of the observer inside the other observation room 90*b*. The human image generator 102 is composed of an observer image generator 102a for generating the image of the observer inside the observation room 90a and an observer image generator 102b for generating the image of the observer inside the observation room 90b. The display image generator 104 is composed of an observation room image generator 104a for generating an image to be displayed in the observation room 90a and an observation room image generator 104b for generating an image to be displayed in the observation room 90b.

The image database 103 includes observer image data 103a representing the image of the observer inside the observation room 90a, observer image data 103b representing the image of the observer inside the observation room 90b, and also common image data 103c representing the image common to the two observation rooms 90a and 90b.

The position data processors 101a and 101b respectively receive positional data from the signal detector groups 97a and 97b arranged in the observation rooms 90a and 90b, and calculate average positions as described above and thereby determine the positions of various parts of the bodies of the individual observers. Moreover, on the basis of the thus determined positions of various parts of the observers' bodies, they also determine the positions of the entire bodies of the observers inside the observation rooms 90a and 90b. On the basis of the positions of various parts of the observers' bodies fed from the position data processors 101a and 101b, the observer image generators 102a and 102b process the observer image data 103a and 103b and generate images of the individual observers.

On the basis of the observers' positions fed from the position data processors 101a and 101b, the observation room image generators 104a and 104b individually process the common image data 103 and generate common images that reflect the individual observers' positions. The two common images generated here have the same content but include some difference resulting from the difference in position of the two observers inside the observation rooms 90a and 90b.

The observation room image generator 104a integrates together one of the generated common images and the image representing the observer inside the observation room 90b fed from the observer image generator 102b. Similarly, the observation room image generator 104b integrates together the other of the generated common images and the image representing the observer inside the observation room 90a fed from the observer image generator 102a. As a result, the image displayed in each of the observation rooms 90a and 90b includes the image of the observer inside the other observation room.

The observation room image generators 104a and 104b respectively feed video signals representing the thus generated images to display circuits 98a and 98b of the observation rooms 90a and 90b, so that the display circuits 98a and 98b display those images individually in the observation rooms 90a and 90b.

Figure 25:
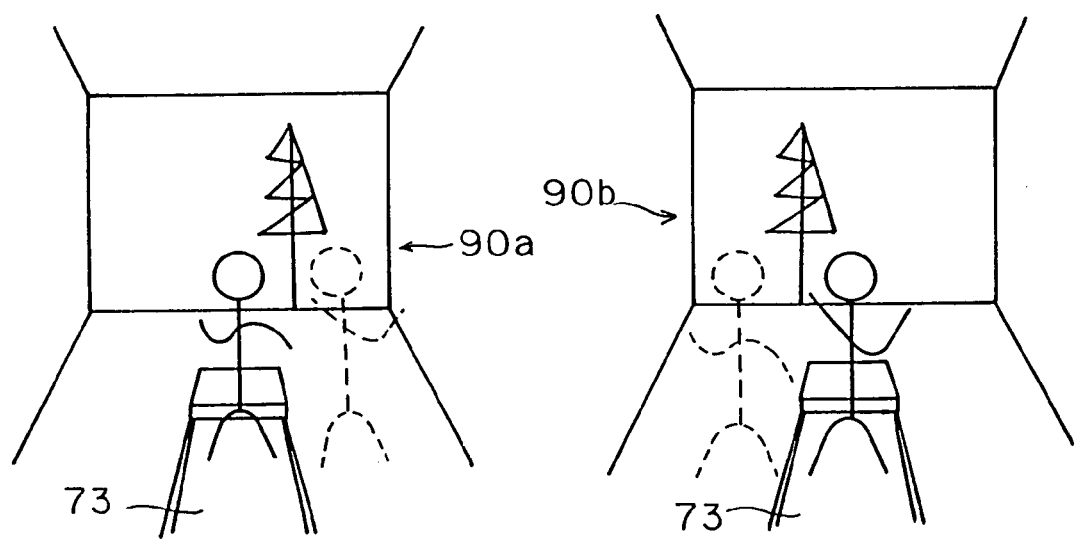
FIG. 25 is a diagram schematically showing the image and the observer in the observation room of the image display apparatus of the ninth embodiment.

FIG. 25 schematically shows the images and the observers inside the observation rooms 90a and 90b. In FIG. 25, the observers indicated by solid lines are the observers that are actually present inside the observation rooms 90a and 90b, and the observers indicated by broken lines are the observers that each actual observer recognizes as the other observer by the displayed images. In FIG. 25, the observers are illustrated as skeletons; however, in reality, the images generated by the controller 93 represent them with fleshiness as described earlier.

As described above, the image display apparatus 9 presents both of the observers with images with a high degree of realism, and in addition offers them a sensation that each observer is beside the other observer and the two are having a common experience. In the observation rooms 90a and 90b shown in FIG. 25, a treadmill 73 as described previously in connection with the seventh embodiment is provided, so that the two observers can enjoy a sensation that they are walking side by side.

Here, to permit detection of the positions of various parts of the observers' bodies, the observers wear the signal generators 96 and the observation rooms 90a and 90b are fitted with the signal detectors 97. However, it is also possible to fit the signal generators 96 to the observation rooms 90a and 90b and fit the signal detectors 97 to the observers. In that case, the observers need to wear also transmitters for transmitting the detected positions to the controller 93. Detection of the positions of various parts of the observers' bodies may be achieved in any manner. For example, such detection can be achieved by monitoring the observers through cameras. It is then also possible to capture the expressions of the observers and reflect those expressions in the observers' images to be displayed. This helps further enhance realism.

In the image display apparatus 9, the image displayed in one observation room includes the image of the observer inside the other observation room. This can be practiced irrespective of the construction adopted to display the images. Specifically, the image display apparatus 9 may be built as a direct-display type in which image display devices are built in the faces of the observation rooms 90a and 90b, or as a projection type in which those faces are formed as screens onto which images are projected from image display devices. When the image display apparatus 9 is built as a projection type, as described earlier in connection with the first to fifth embodiments, it is possible to simplify the construction by making the number of image display devices smaller than the number of screens. In the image display apparatus 9, the images projected onto its two observation rooms 90a and 90b may be displayed with a single set of image display devices.

The above description deals with a case where the image display apparatus is provided with two observation rooms 90a and 90b; however, it is also possible to provide it with three or more observation rooms. In that case, through control similar to that described above, it is possible for a number of observers to share an image with a high degree of realism.

Obviously, many modifications and variations of the present invention are possible in light of the above teachings. It is therefore to be understood that within the scope of the appended claims, the invention may be practiced other than as specifically described.

What is claimed is:

1. An image display system comprising:
   at least two screens onto which images are projected, the at least two screens forming inner wall faces of an observation room for housing an observer;
   at least one display device for displaying the images that are to be projected onto the at least two screens, wherein the display device is arranged outside the observation room such that optical paths from, the images projected onto two of said at least two screens are different, and a total number of display devices is smaller than a total number of screens;

at least one projection optical system for projecting the images displayed on the display device onto the at least two screens, wherein optical paths from the at least one display device to the at least two screens have the same length, wherein a total number of projection optical systems is equal to the total number of display devices.

2. An image display system as claimed in claim 1,
wherein the display device displays on a time-division basis the images to be projected onto the screens.

3. An image display system as claimed in claim 2,
wherein the projection optical system includes a shutter that is opened and closed in synchronism with switching of the images displayed on the display device.

4. An image display system as claimed in claim 1,
wherein the display device displays simultaneously the images projected onto the screens, and
wherein a total number of projection optical systems is equal to the total number of screens.

5. A method of building an image display system as comprising:
   a step of installing at least two screens onto which images are projected, wherein the at least two screens form inner wall faces of an observation room for housing an observer;
   a step of installing at least one display device, outside the observation room, for displaying the images that are to be projected onto the at least two screens, wherein the images displayed on two of said at least two screens are different, and a total number of display devices is smaller than a total number of screens;
   a step of installing at least one projection optical system for projecting the images displayed on the display device onto the at least two screens, wherein optical paths from the at least one display device to the at least two screens have substantially the same length; and
   a step of projecting the images displayed on the display device through the projection optical system onto the screens;
   wherein, in the step of installing the projection optical system, a total number of projection optical systems installed is equal to the total number of display devices.

6. A method of building an image display system as claimed in claim 5,
   wherein, in the step of projecting the images, the display device displays on a time-division basis the images to be projected onto the screens.

7. A method of building an image display system as claimed in claim 6,
   wherein the projection optical system includes a shutter, and
   wherein, in the step of projecting the images, the projection optical system opens and closes the shutter in synchronism with switching of the images displayed on the display device.

8. A method of building an image display system comprising:
   a step of installing at least two screens onto which images are projected, wherein the at least two screens form inner wall faces of an observation room for housing an observer;
   a step of installing at least one display device, outside the observation room, for displaying the images that are to be projected onto the at least two screens, wherein the images displayed on two of said at least two screens are different, and a total number of display devices is smaller than a total number of screens;
   a step of installing at least one projection optical system for projecting the images displayed on the display device onto the at least two screens, wherein optical paths from the at least one display device to the at least two screens have substantially the same length; and
   a step of projecting the images displayed on the display device through the projection optical system onto the screens;
   wherein, in the step of projecting the images, the display device displays simultaneously the images projected onto the at least two screens; and
   wherein, in the step of installing the projection optical system, a total number of projection optical systems installed is equal to the total number of screens.

* * * * *